US012298706B2

(12) United States Patent
Abe et al.

(10) Patent No.: US 12,298,706 B2
(45) Date of Patent: May 13, 2025

(54) IMAGE FORMING APPARATUS WITH DETECTABLE CARTRIDGE

(71) Applicant: CANON KABUSHIKI KAISHA, Tokyo (JP)

(72) Inventors: Daisuke Abe, Shizuoka (JP); Koji Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/510,497

(22) Filed: Nov. 15, 2023

(65) Prior Publication Data

US 2024/0085851 A1 Mar. 14, 2024

Related U.S. Application Data

(63) Continuation of application No. 18/045,706, filed on Oct. 11, 2022, now Pat. No. 11,841,674, which is a continuation of application No. 17/379,438, filed on Jul. 19, 2021, now Pat. No. 11,487,242.

(30) Foreign Application Priority Data

Jul. 21, 2020 (JP) ................................ 2020-124528

(51) Int. Cl.

*G03G 15/00* (2006.01)
*G03G 21/16* (2006.01)
*G03G 21/18* (2006.01)

(52) U.S. Cl.

CPC ..... *G03G 21/1878* (2013.01); *G03G 21/1633* (2013.01); *G03G 21/1814* (2013.01); *G03G 21/1652* (2013.01); *G03G 21/1867* (2013.01); *G03G 2221/169* (2013.01); *G03G 2221/1869* (2013.01)

(58) Field of Classification Search

CPC .......... G03G 21/1633; G03G 21/1652; G03G 21/1814; G03G 21/1821; G03G 21/1867; G03G 21/1875; G03G 21/1878; G03G 21/1885; G03G 2221/169; G03G 2221/1869

See application file for complete search history.

(56) References Cited

U.S. PATENT DOCUMENTS

2018/0095420 A1* 4/2018 Abe .................. G03G 21/1867
2019/0041791 A1* 2/2019 Kishi ................ G03G 21/1853

* cited by examiner

*Primary Examiner* — Hoang X Ngo
(74) *Attorney, Agent, or Firm* — Canon U.S.A., Inc. I.P. Division

(57) ABSTRACT

An image forming apparatus includes an apparatus body including a main contact, and a main guide, and a cartridge including a memory contact, a moving unit moving into and out of the apparatus body in a first direction and including a frame to which the cartridge is attached, first and second protrusions protruding in a second direction orthogonal to the first direction from the end surface of the frame, an intermediate contact being in electrical contact with the memory contact, an unit contact being in electrical contact with the main contact, and a line conductor, the first protrusion being supported by the main guide of the apparatus body, the second protrusion being located above the first protrusion. At least part of the line conductor connecting the intermediate contact and the unit contact is located in a recess formed by the first protrusion, the second protrusion, and the end surface.

24 Claims, 29 Drawing Sheets

IMAGE FORMING APPARATUS WITH DETECTABLE CARTRIDGE

CROSS-REFERENCE TO RELATED APPLICATIONS

The present application is a continuation of U.S. patent application Ser. No. 18/045,706, filed on Oct. 11, 2022, which is a continuation of U.S. patent application Ser. No. 17/379,438, filed on Jul. 19, 2021 and issued as U.S. Pat. No. 11,487,242 on Nov. 1, 2022, which claims priority from Japanese Patent Application No. 2020-124528, filed Jul. 21, 2020, all of which are hereby incorporated by reference herein in their entireties.

BACKGROUND

Field

The present disclosure relates to electrophotographic image forming apparatuses.

Description of the Related Art

An image forming apparatus including a moving unit movable with respect to the apparatus's main body of the image forming apparatus, the moving unit into which a cartridge provided with a memory unit is installable. Patent Literature 1, JP2019-28346, discusses a moving unit having an intermediate contact configuration for electrically connecting the electrical contacts of the memory unit of a cartridge to the electrical contacts of the apparatus main body.

SUMMARY

The present disclosure is directed to providing one form of an image forming apparatus provided with a moving unit having the foregoing intermediate contact configuration. According to an aspect of the present disclosure, an image forming apparatus includes an apparatus main body including an electrical board, a main body electrical contact electrically connected to the electrical board, and a main body guide portion, and a cartridge including a developing roller and a memory, the memory including a memory electrical contact, a moving unit configured to move into and out of the apparatus main body in a first direction, the moving unit including a photosensitive drum, a frame rotatably supporting the photosensitive drum, the frame to and from which the cartridge is attached and detached, an intermediate electrical contact configured to be in electrical contact with the memory electrical contact of the cartridge, a unit electrical contact configured to be in electrical contact with the main body electrical contact, a line conductor configured to connect the intermediate electrical contact and the unit electrical contact, and a to-be-guided portion configured to be guided by the main body guide portion of the apparatus main body. The to-be-guided portion is located on an end surface of the frame of the moving unit in a second direction, the second direction being a direction intersecting both the first direction and a vertical direction, the to-be-guided portion being configured to be guided by the main body guide portion of the apparatus main body while the moving unit is attached and detached to or from the apparatus main body, the to-be-guided portion including a first protrusion and a second protrusion, the first protrusion and the second protrusion protruding in the second direction from the end surface of the frame and extending in the first direction, the first protrusion being supported from under the first protrusion by the main body guide portion of the apparatus main body, the second protrusion being located above the first protrusion and facing the first protrusion. At least part of the line conductor is located in a recess formed by the first protrusion, the second protrusion, and the end surface, the at least part of the line conductor extending in the first direction.

DESCRIPTION OF THE EMBODIMENTS

In the following description, some exemplary embodiments will be illustratively described in detail with reference to the drawings and examples. The functions, materials, shapes, and relative arrangements of the components described in the exemplary embodiments are not intended to limit the scope of the disclosure thereto unless otherwise specified. The functions, materials, and shapes of members once described below remain unchanged from the initial description unless specified again.

In the following description, the side of the front door included in an image forming apparatus will be referred to as a front side, and the side opposite to the front side will be referred to as a back side. The left side of the image forming apparatus as seen from the front will be referred to as a left side, and the right side a right side.

The direction in which the drum rotation axes of photosensitive drums included in a cartridge tray extend will be referred to as a D1 direction (second direction). The direction intersecting the D1 direction (in the present exemplary embodiments, the direction in which developing cartridges are inserted into the cartridge tray) will be referred to as a D2 direction (third direction). The direction in which the cartridge tray is inserted into the image forming apparatus will be referred to as a D3 direction (first direction). The D1 direction and the D2 direction intersect or are orthogonal to each other. The D2 direction and the D3 direction intersect or are orthogonal to each other. The D3 direction and the D1 direction intersect or are orthogonal to each other. In the present exemplary embodiments, the D2 direction is a vertical direction. The D3 direction is a direction orthogonal to both the D1 and D2 directions.

[Overall Configuration]

Figure 1:
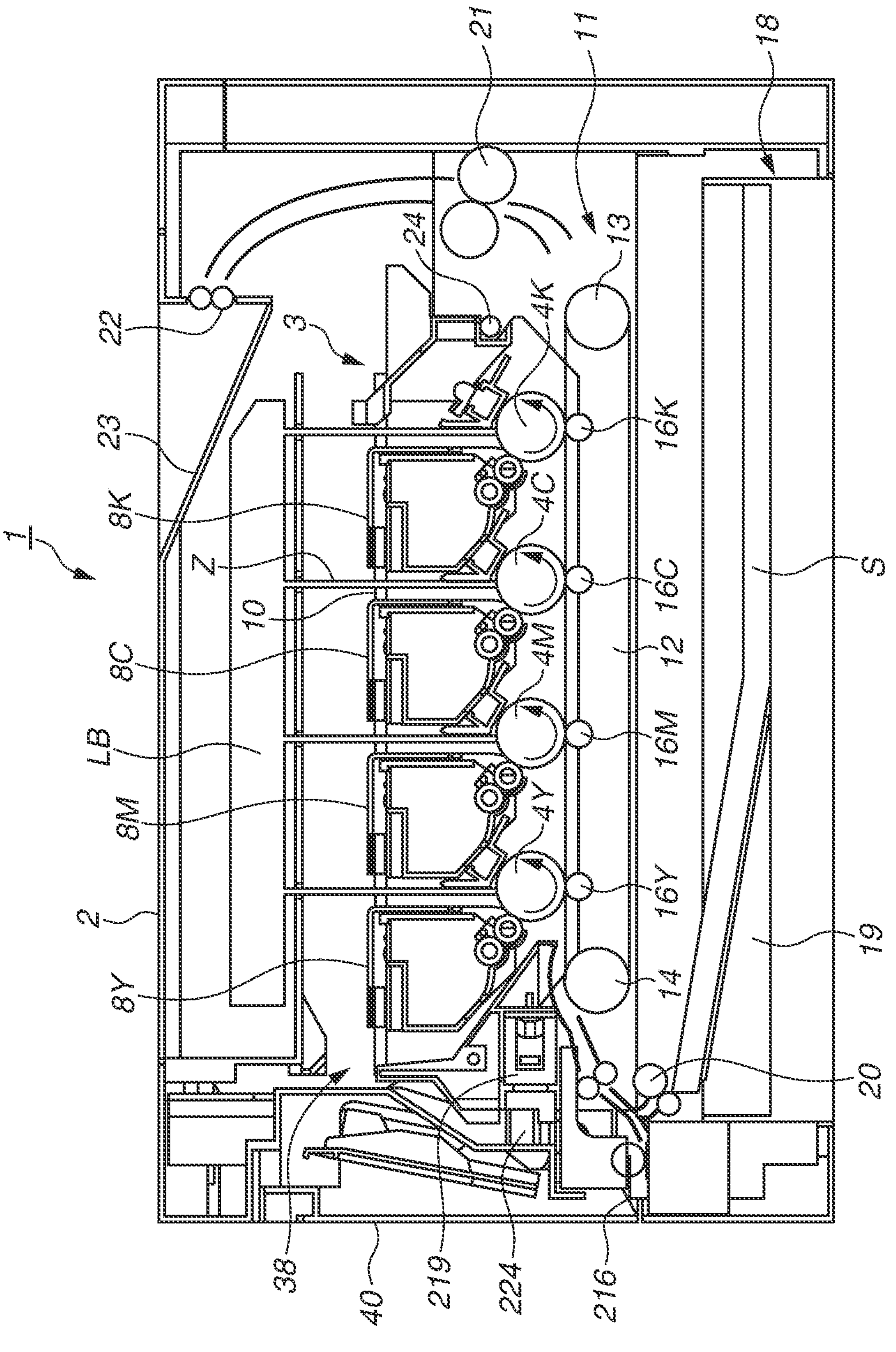
FIG. 1 is a schematic sectional view of an image forming apparatus according to a first exemplary embodiment.

A first exemplary embodiment will initially be described. FIG. 1 is an overall schematic diagram illustrating an image forming apparatus 1 according to the present exemplary embodiment. The image forming apparatus 1 is a four-color full-color laser beam printer using an electrophotographic image forming process to form color images on sheets S.

As illustrated in FIG. 1, the image forming apparatus 1 includes an apparatus main body 2, a cartridge tray 3 (moving unit) including photosensitive drums 4Y, 4M, 4C, and 4K, and developing cartridges 8Y, 8M, 8C, and 8K. The cartridge tray 3 is detachably attached to the apparatus main body 2. The cartridge tray 3 is a tray for the four developing cartridges 8Y, 8M, 8C, and 8K to be detachably installed therein. The cartridge tray 3 is movable with respect to the apparatus main body 2 with the developing cartridges 8Y, 8M, 8C, and 8K installed therein.

In the following description, the cartridge tray 3 with the developing cartridges 8Y, 8M, 8C, and 8K installed therein may be referred to as a drawer unit 3. The image forming position where the photosensitive drums 4Y, 4M, 4C, and 4K form images will be referred to as a first position, and the pull-out position where the developing cartridges 8Y, 8M, 8C, and 8K are exposed to the outside of the apparatus main body 2 will be referred to as a second position. The cartridge tray 3 is movable between the first position and the second position.

The image forming apparatus 1 forms images on sheets S (for example, printing paper) using developers (for example, toners) supplied from the developing cartridges 8Y, 8M, 8C, and 8K.

In the present exemplary embodiment, the four developing cartridges 8Y, 8M, 8C, and 8K are attached to the one cartridge tray 3. The four developing cartridges 8Y, 8M, 8C, and 8K each contain a color developer (hereinafter, also referred to as toner) different from one another (for example, yellow, magenta, cyan, and black). In some embodiments, the number of developing cartridges 8 attached to the cartridge tray 3 ranges from one to three, or is five or more.

Figure 4:
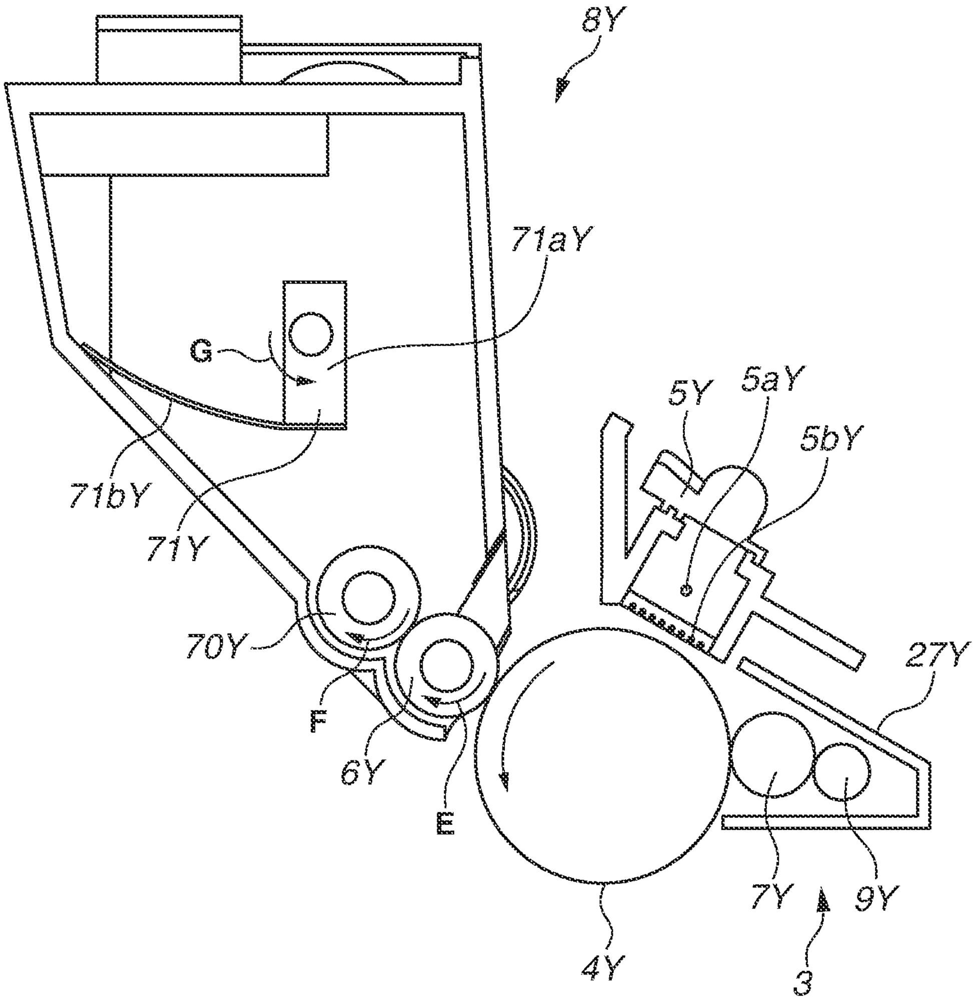
FIG. 4 is an example of an enlarged cross-sectional view of a developing cartridge.

The developing cartridges 8Y, 8M, 8C, and 8K have substantially the same configuration except for the colors of their toner images. The configuration of the developing cartridge 8Y will therefore be mainly described. As for the other developing cartridges 8M, 8C, and 8K, the differences from the developing cartridge 8Y will be described. FIG. 4 is a schematic cross-sectional view of the cartridge tray 3 and the developing cartridge 8Y according to the present exemplary embodiment.

As illustrated in FIG. 4, the cartridge tray 3 includes the photosensitive drum 4Y corresponding to the developing cartridge 8Y. The photosensitive drum 4Y rotates with a toner image about the rotation axis extending in the D1 direction. In other words, the D1 direction is the rotation axis direction of the rotation axis of the photosensitive drum 4Y. The cartridge tray 3 includes a charging member 5Y, a first cleaning roller 7Y, which act on the photosensitive drum 4Y, and a second cleaning roller 9Y. The charging member 5Y is a scorotron corona charging device, and includes a discharge wire 5*a*Y and a grid electrode 5*b*Y. The developing cartridge 8Y includes a developing roller 6Y to develop an electrostatic latent image on the photosensitive drum 4Y. In FIG. 1, the first and second cleaning rollers 7Y and 9Y are not illustrated. The other developing cartridges 8M, 8C, and 8K do not include a second cleaning roller 9.

As illustrated in FIG. 1, a laser scanner unit LB is located above the cartridge tray 3. The laser scanner unit LB emits laser light Z based on image information. The laser light Z passes through each exposure window 10 and scans and exposes the surface of the corresponding photosensitive drum 4.

An electrostatic attraction belt unit 11 is located below the developing cartridges 8Y, 8M, 8C, and 8K, and the cartridge tray 3. The electrostatic attraction belt unit 11 includes a driving roller 13 and a tension roller 14. An electrostatic attraction belt 12 having plasticity is stretched across the driving roller 13 and the tension roller 14. The photosensitive drums 4Y, 4M, 4C, and 4K included in the cartridge tray 3 are in contact with the top surface of the electrostatic attraction belt 12.

Inside the electrostatic attraction belt 12, transfer rollers 16Y, 16M, 16C, and 16K are located at positions facing the photosensitive drums 4Y, 4M, 4C, and 4K, respectively. Toner images borne on the photosensitive drums 4Y, 4M, 4C, and 4K are transferred to a sheet S by application of each transfer bias to the corresponding one of the transfer rollers 16Y, 16M, 16C, and 16K, respectively.

A feed unit 18 is located below the electrostatic attraction belt unit 11. The feed unit 18 includes a feed tray 19 accommodating a stack of sheets S, and a feed roller 20, and feeds the sheets S. A fixing unit 21 for fixing an image to a sheet S is located behind (in FIG. 1, on the right of) the electrostatic attraction belt unit 11. A discharge unit 22 for discharging the sheet S to outside the image forming apparatus 1 is located in the upper part of the apparatus main body 2.

Figure 2A:
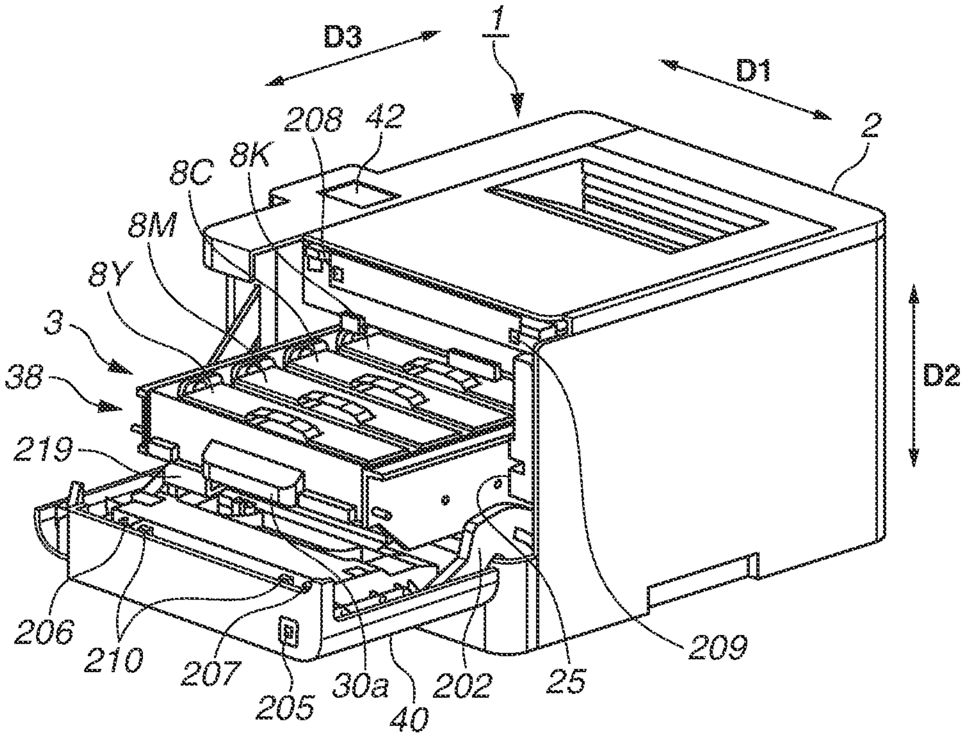
FIG. 2A is a perspective view of the image forming apparatus with a cartridge tray pulled out.
Figure 2B:
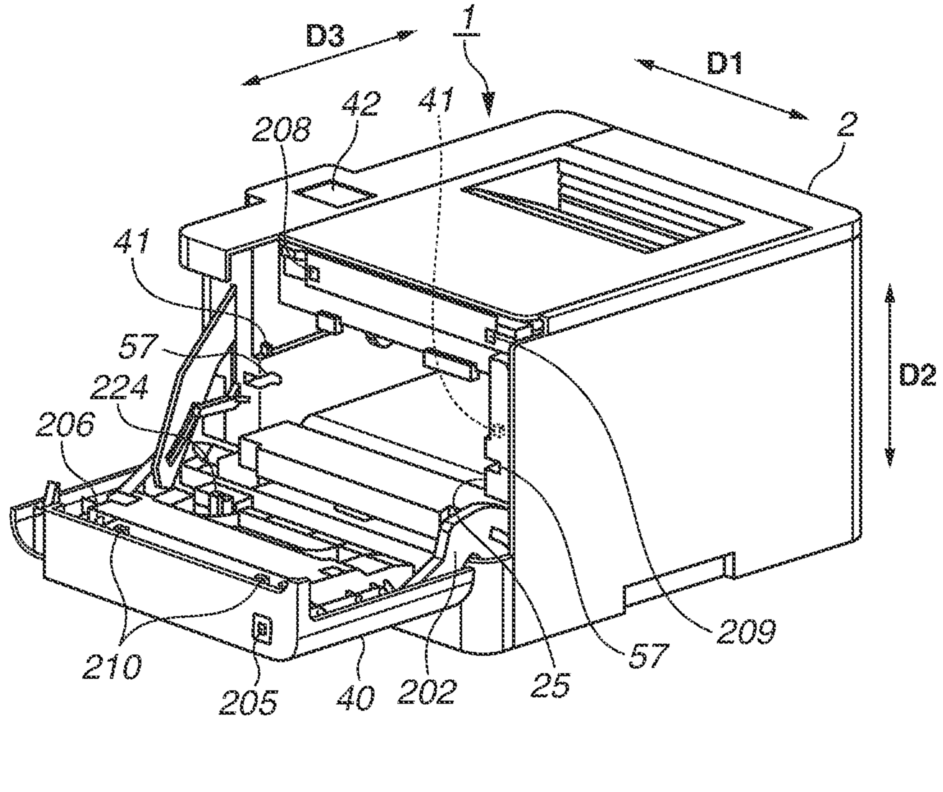
FIG. 2B is a perspective view of the image forming apparatus without the cartridge tray.

FIG. 2A is a perspective view illustrating the image forming apparatus 1 according to the present exemplary embodiment. FIG. 2B is a perspective view illustrating the image forming apparatus 1 with the cartridge tray 3 removed. As illustrated in FIG. 2A, after a front door 40 of the image forming apparatus 1 is opened, the cartridge tray 3 is installed movably along guide rails 41 (guide portions) (see FIG. 2B) in the apparatus main body 2. The cartridge tray 3 moves in the D3 direction (first direction). Details of the opening and closing of the front door 40 will be described below. The developing cartridges 8Y, 8M, 8C, and 8K in the cartridge tray 3 is individually replaceable.

The apparatus main body 2 has an opening 25 for the drawer unit 3 to pass through. The apparatus main body 2 supports the front door 40 movably between the closed position to cover the opening 25 and the open position to open the opening 25.

Figure 3:
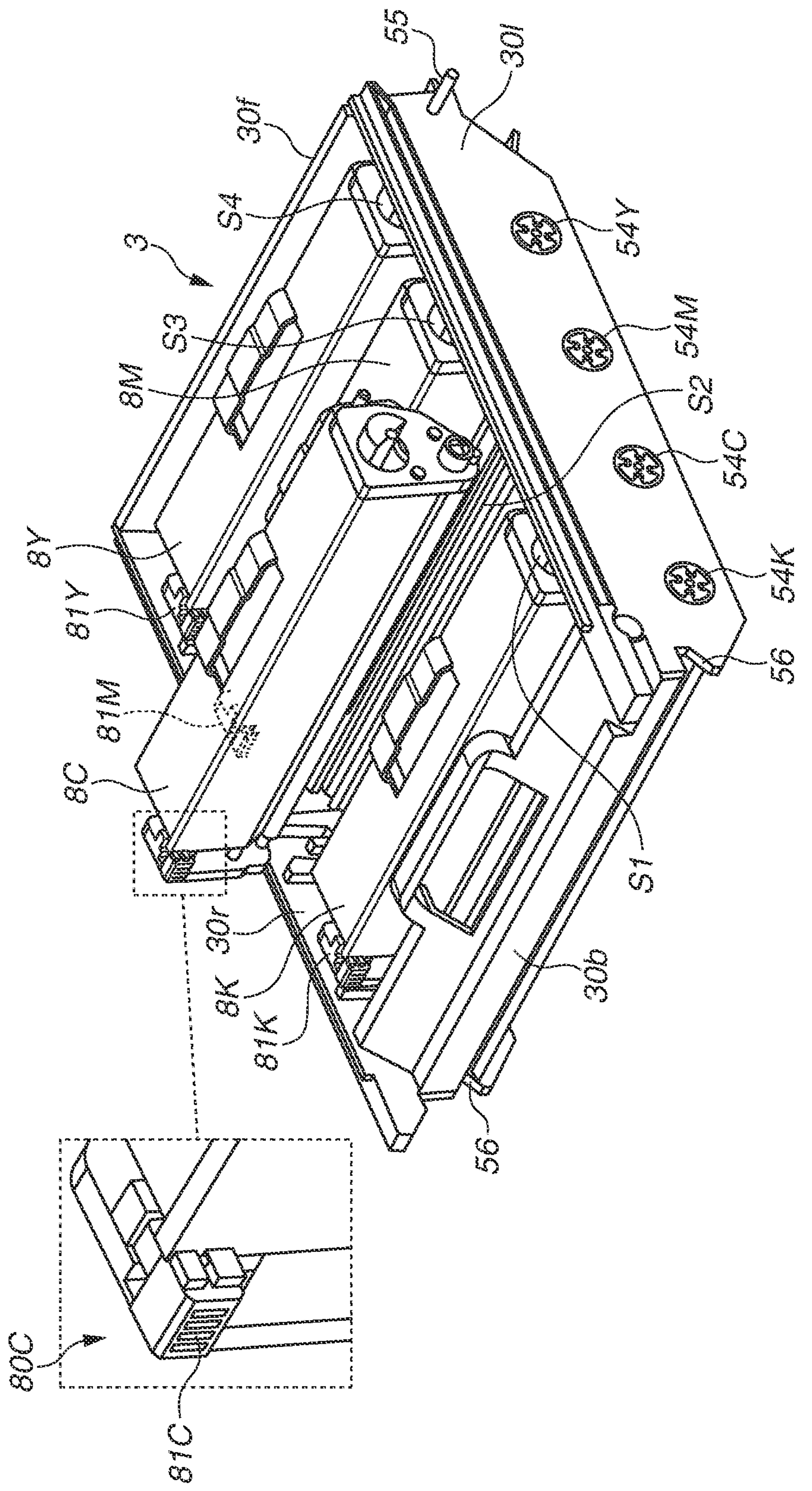
FIG. 3 is an example of a perspective view of the cartridge tray and developing cartridges.

FIG. 3 is a perspective view illustrating the cartridge tray 3 and the developing cartridges 8Y, 8M, 8C, and 8K according to the present exemplary embodiment. In FIG. 3, the developing cartridge 8C is being taken out of the cartridge tray 3. The developing cartridges 8Y, 8M, 8C, and 8K are attached and detached to/from four slots S1, S2, S3, and S4 (mounting portions), respectively, in a tray frame 30 to be described below of the cartridge tray 3.

As illustrated in FIG. 3, the developing cartridge 8C as a developing unit includes a memory tag unit 80C to which a memory tag 81C (memory medium) is attached. The memory tag 81C is a contact integrated circuit (IC) chip and includes electrical contact portions. The memory tag 81C contacts a memory contact 720C (intermediate electrical contact) (see FIG. 6) on the cartridge tray 3 to electrically connect to the image forming apparatus 1. The memory tag 81C stores information about the developing cartridge 8C.

Figure 9:
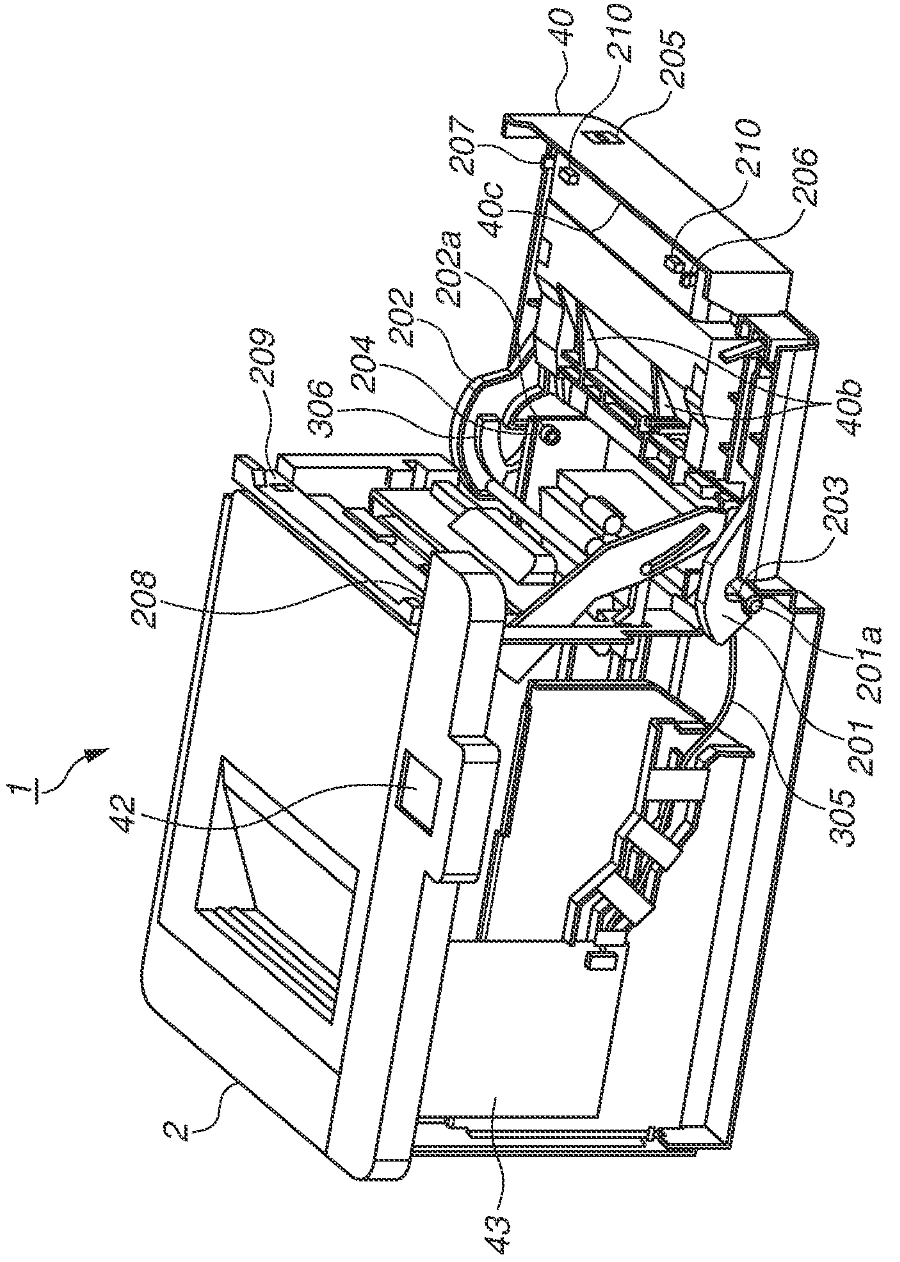
FIG. 9 is an example of a perspective view of the front door.

As illustrated in FIG. 9, the image forming apparatus 1 further includes a control board 43 and a display unit 42. The control board 43 includes a processor such as a central processing unit (CPU), and various types of memories, and constitutes a circuit board, for example. The processor on the control board 43 executes various types of processing of the image forming apparatus 1 based on programs. The control board 43 is electrically connected to memory tags 81Y, 81M, 81C, and 81K of the developing cartridges 8Y, 8M, 8C, and 8K, respectively, as described below, and performs information processing on the memory tags 81Y, 81M, 81C, and 81K. Information such as the amount of the remaining developer of each corresponding one of the developing cartridges 8Y, 8M, 8C, and 8K is notified to the user via the display unit 42 on the image forming apparatus 1.

[Image Forming Operation]

Next, an image forming operation will be described with reference to FIGS. 1 and 4. The following is a description of an operation for forming a full-color image. The closing of the front door 40 completes the attachment of the cartridge tray 3 and the developing cartridges 8Y, 8M, 8C, and 8K to the image forming apparatus 1.

As the front door 40 is closed, drum driving couplings (not illustrated) in the image forming apparatus 1 are brought into engagement with drum couplings 54Y, 54M, 54C, and 54K (see FIG. 3) connected to the photosensitive drums 4Y, 4M, 4C, and 4K, respectively. A driving output motor and gears (not illustrated) in the image forming apparatus 1 rotates the drum couplings 54Y, 54M, 54C, and 54K. The photosensitive drums 4Y, 4M, 4C, and 4K are driven to rotate in the directions of the arrows in FIG. 1 at a predetermined speed via the drum couplings 54Y, 54M, 54C, and 54K, respectively. The electrostatic attraction belt 12 is also driven to rotate at a speed corresponding to that of the photosensitive drums 4Y, 4M, 4C, and 4K.

At that time, the laser scanner unit LB is driven to emit light. In synchronization with the light emission of the laser scanner unit LB, the charging members 5Y, 5M, 5C, and 5K uniformly charge the surfaces of the photosensitive drums 4Y, 4M, 4C, and 4K, respectively, to a predetermined polarity and potential. The laser scanner unit LB scans and exposes the surfaces of the photosensitive drums 4Y, 4M, 4C, and 4K with the laser light Z based on image signals of the respective colors, forming electrostatic latent image on the surface of each corresponding one of the photosensitive drums 4Y, 4M, 4C, and 4K based on the corresponding image signals.

In FIG. 4, the electrostatic latent image on the photosensitive drum 4Y is developed by the developing roller 6Y driven to rotate in the direction of the arrow E at a predetermined speed. A supply roller 70Y, in contact with the surface of the developing roller 6Y, is driven to rotate in the direction of the arrow F. An agitation member 71Y includes a shaft member 71*a*Y and a sheet member 71*b*Y, and is driven to rotate in the direction of the arrow G.

Through such an electrophotographic image forming process, the yellow toner image corresponding to the yellow component of a full-color image is formed on the photosensitive drum 4Y. Meanwhile, the feed unit 18 separates and feeds a sheet S one by one at a predetermined control timing. A sheet S is conveyed along the photosensitive drums 4Y, 4M, 4C, and 4K by the electrostatic attraction belt 12.

In response to the arrival of the sheet S at the photosensitive drum 4Y at a predetermined control timing, the toner image on the photosensitive drum 4Y is transferred to the sheet S. Toner images corresponding to magenta, cyan, and black are similarly formed on the photosensitive drums 4M, 4C, and 4K, respectively. The toner images are then transferred to the sheet S in an overlapping manner in order of magenta, cyan, and black. A four-color full-color unfixed toner image in yellow, magenta, cyan, and black is thereby formed on the sheet S.

The toner image transferred to the sheet S is fixed by the fixing unit 21. The sheet S past the fixing unit 21 is discharged to a discharge tray 23 by the discharge unit 22.

Residual toner and paper dust remaining on the photosensitive drum 4Y are physically and electrically removed from the photosensitive drum 4Y by the first cleaning roller 7Y. Part of the residual toner is held on the first cleaning roller 7Y, and the other part of the residual toner is electrically charged by the first cleaning roller 7Y and returned to the photosensitive drum 4Y. The residual toner returned to the photosensitive drum 4Y is returned to the developing roller 6Y. The paper dust is physically and electrically removed from the first cleaning roller 7Y by the second cleaning roller 9Y.

[Configuration of Cartridge Tray]

Figure 5A:
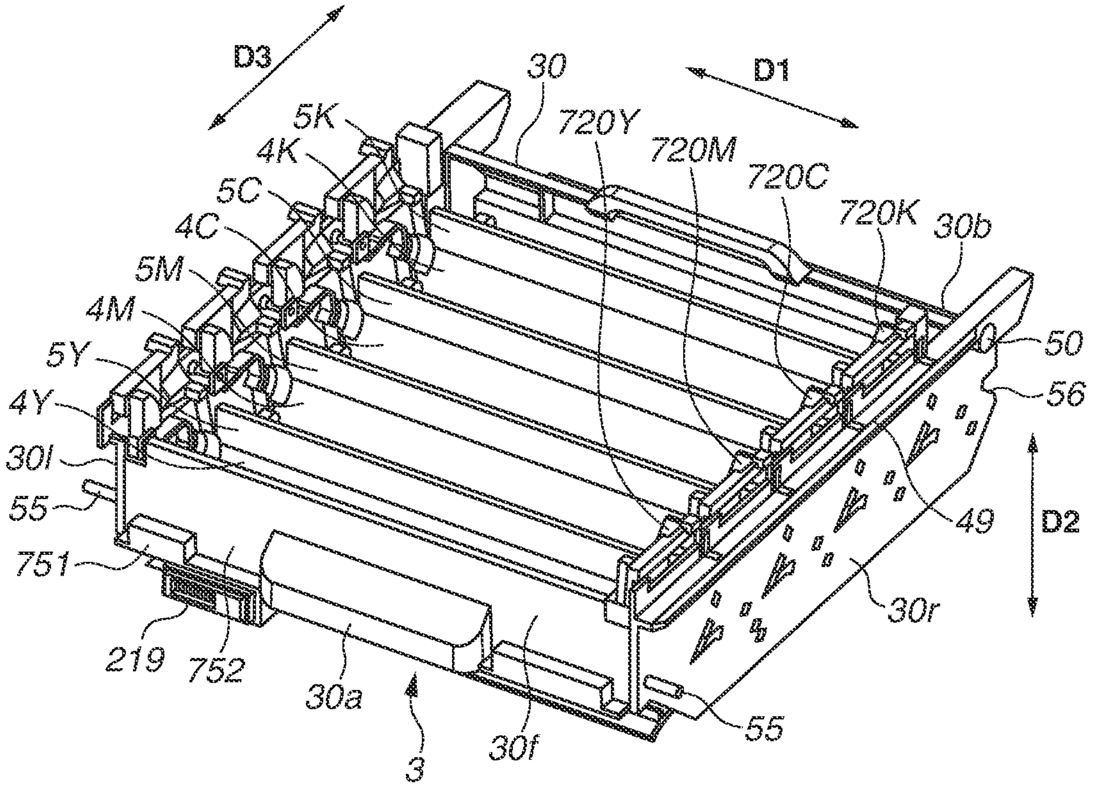
FIG. 5A is an example of a perspective view of the cartridge tray.
Figure 5B:
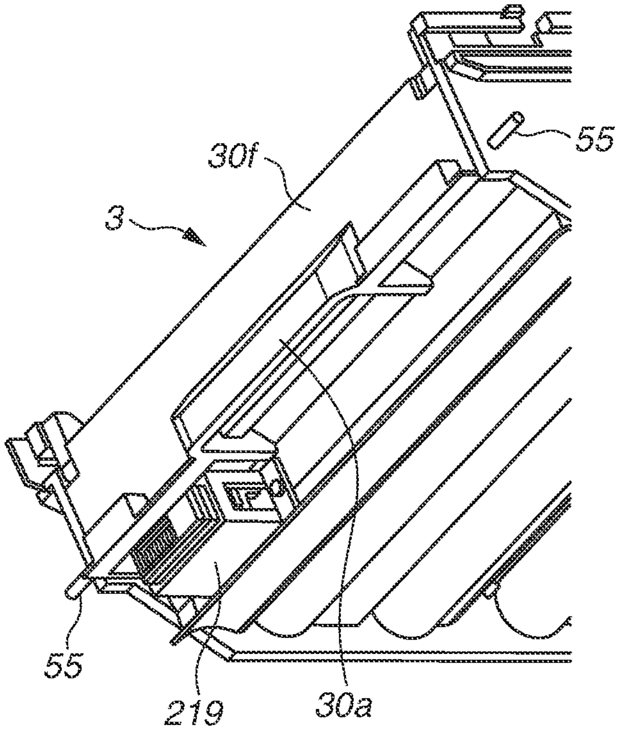
FIG. 5B is an enlarged perspective view of a front part of the cartridge tray.
Figure 18A:
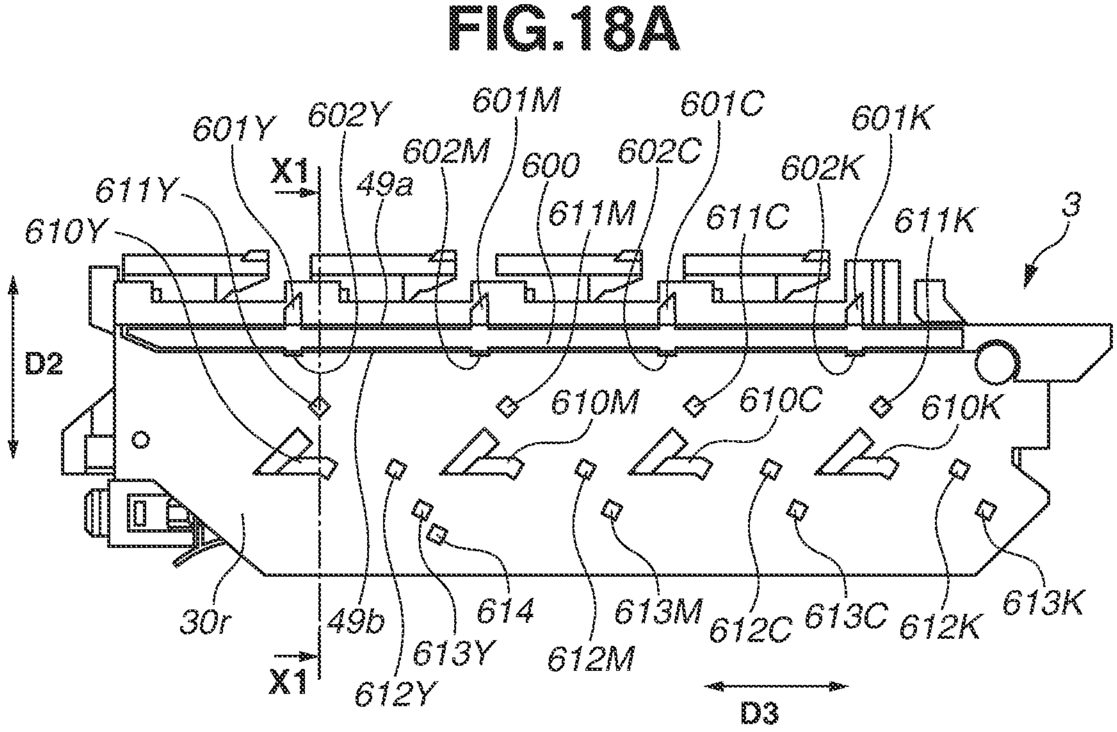
FIG. 18A is an example of a side view illustrating the contact members on the cartridge tray.
Figure 18B:
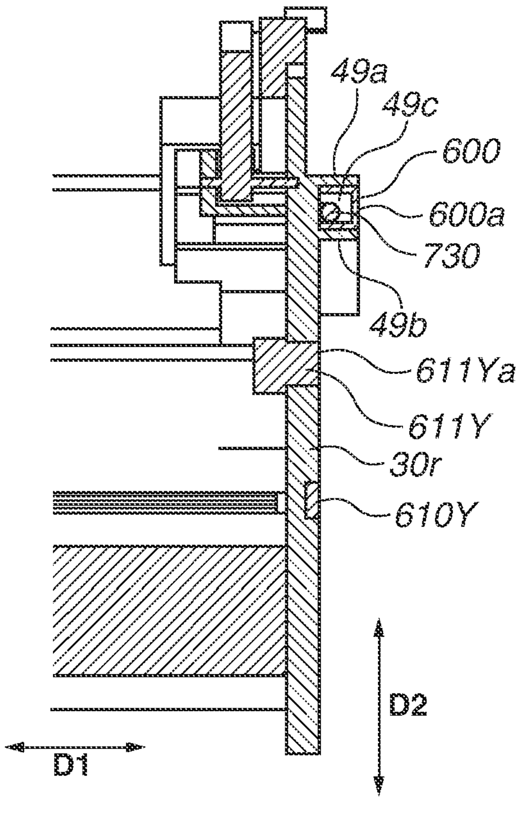
FIG. 18B is an example of an enlarged sectional view of the wiring unit of the cartridge tray in the direction orthogonal to a D3 direction.
Figure 18C:
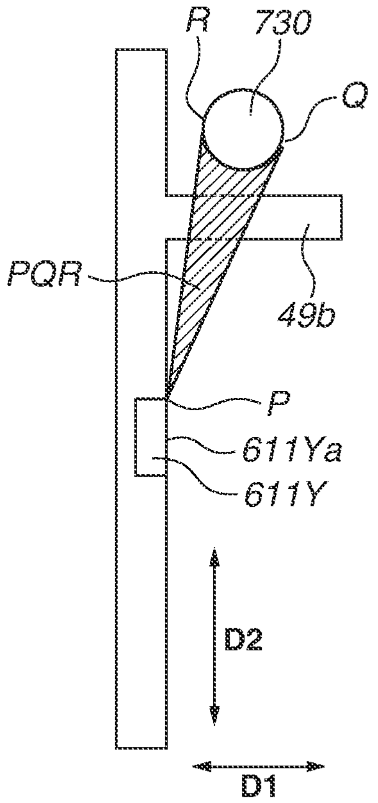
FIG. 18C is an example of a diagram illustrating a positional relationship between a first tray charging contact and the wiring unit.

Next, a configuration of the cartridge tray 3 will be described with reference to FIGS. 5A, 5B, and 18A to 18C. FIG. 5A is a perspective view illustrating the cartridge tray 3. FIG. 5B is an enlarged perspective view illustrating the front side (front part) of the cartridge tray 3. FIG. 18A is a right side view of the cartridge tray 3. FIG. 18B is a cross-sectional view taken along the line X1-X1 of FIG. 18A. FIG. 18C will be described below.

The cartridge tray 3 includes the tray frame 30 (second frame), a through shaft 55, the photosensitive drums 4Y, 4M, 4C, and 4K, the charging members 5Y, 5M, 5C, and 5K, and the cleaning frames 27Y, 27M, 27C, and 27K (FIG. 4).

As illustrated in FIG. 5A, the tray frame 30 includes four surfaces: a right side surface 30*r*, a left side surface 301, a front surface 30*f*, and a back surface 30*b*. The right side surface 30*r*, which is located on the outer side of the cartridge tray 3 in the D1 direction, covers the right side. Similarly, the left side surface 301, which is located at the outer side of the cartridge tray 3 in the D1 direction, covers the left side. The front surface 30*f* and the back surface 30*b* are surfaces connecting the right side surface 30*r* and the left side surface 301. The front surface 30*f* is located on the front side of the cartridge tray 3, and the back surface 30*b* is located on the back side.

The through shaft 55 is supported by the right side surface 30*r* and the left side surface 301. Both ends of the through shaft 55 protrude outside in the D1 direction from the right and left side surfaces 30*r* and 301. Positioning grooves 56 are formed in the back sides of the right and left side surfaces 30*r* and 301 (the one in the left side surface 301 is not illustrated). The through shaft 55 is supported by shaft engagement portions 57 on the apparatus main body 2 illustrated in FIG. 2B. The positioning grooves 56 are supported by a positioning shaft 24 of the apparatus main body 2 illustrated in FIG. 1. The cartridge tray 3 is thereby positioned to the apparatus main body 2.

As illustrated in FIG. 5A, the photosensitive drums 4Y, 4M, 4C, and 4K, which are rotatably supported by the right and left side surfaces 30*r* and 301, are attached rotatably about rotation axes extending in the D1 direction. The charging members 5Y, 5M, 5C, and 5K and the cleaning frames 27Y, 27M, 27C, and 27K (FIG. 4) are integrally supported by the right and left side surfaces 30*r* and 301.

As illustrated in FIG. 18A, tray developing contacts 610Y, 610M, 610C, and 610K, first tray charging contacts 611Y, 611M, 611C, and 611K, and second tray charging contacts 612Y, 612M, 612C, and 612K are located in the right side surface 30*r*. First tray cleaner contacts 613Y, 613M, 613C, and 613K and a second tray cleaner contact 614 are also located in the right side surface 30*r*.

Voltages are supplied to the tray developing contacts 610Y, 610M, 610C, and 610K, the first tray charging contacts 611Y, 611M, 611C, and 611K, and the second tray charging contacts 612Y, 612M, 612C, and 612K in contact with not-illustrated contacts of the apparatus main body 2. Similarly, voltages are supplied to the first tray cleaner contacts 613Y, 613M, 613C, and 613K and the second tray cleaner contact 614 in contact with not-illustrated contacts of the apparatus main body 2.

A further description will be given with reference to FIGS. 18A and 4. FIG. 4 representatively illustrates the configuration for yellow.

The tray developing contacts 610Y, 610M, 610C, and 610K are electrically connected to the developing rollers 6Y, 6M, 6C, and 6K, respectively.

The first tray charging contacts 611Y, 611M, 611C, and 611K are electrically connected to the discharging wires 5*a*Y, SaM, SaC, and 5*a*K, respectively. The second tray charging contacts 612Y, 612M, 612C, and 612K are electrically connected to the grid electrodes 5*b*Y, 5*b*M, 5*b*C, and 5*b*K, respectively.

The first tray cleaner contacts 613Y, 613M, 613C, and 613K are electrically connected to the first cleaning rollers 7Y, 7M, 7C, and 7K, respectively, which each are rotatable about the corresponding rotation axis extending in the D1 direction.

The second tray cleaner contact 614 is electrically connected to the second cleaning roller 9Y.

In the present exemplary embodiment, corona charging devices are used as charging units. However, the charging units are not limited to this example, and may be charging rollers in contact with the photosensitive drums 4.

While the cleaning rollers 7 and 9 are used in the present exemplary embodiment, rubber blades or sheets may be used as a configuration for removing residual toner and paper dust.

As illustrated in FIGS. 5A and 5B, an operation portion 30*a* serving as a grip is located on the front surface 30*f*. The front surface 30*f* as an opposed surface is opposed to the front door 40 at its closed position. The operation portion 30*a* protrudes forward from the front surface 30*f*.

The operation portion 30*a* (grip) is located at the center of the front surface 30*f* in the D1 direction, and has a recess in its lower part so that the user can put his/her fingers in from under the operation portion 30*a* to grip the operation portion 30*a*.

Figure 6:
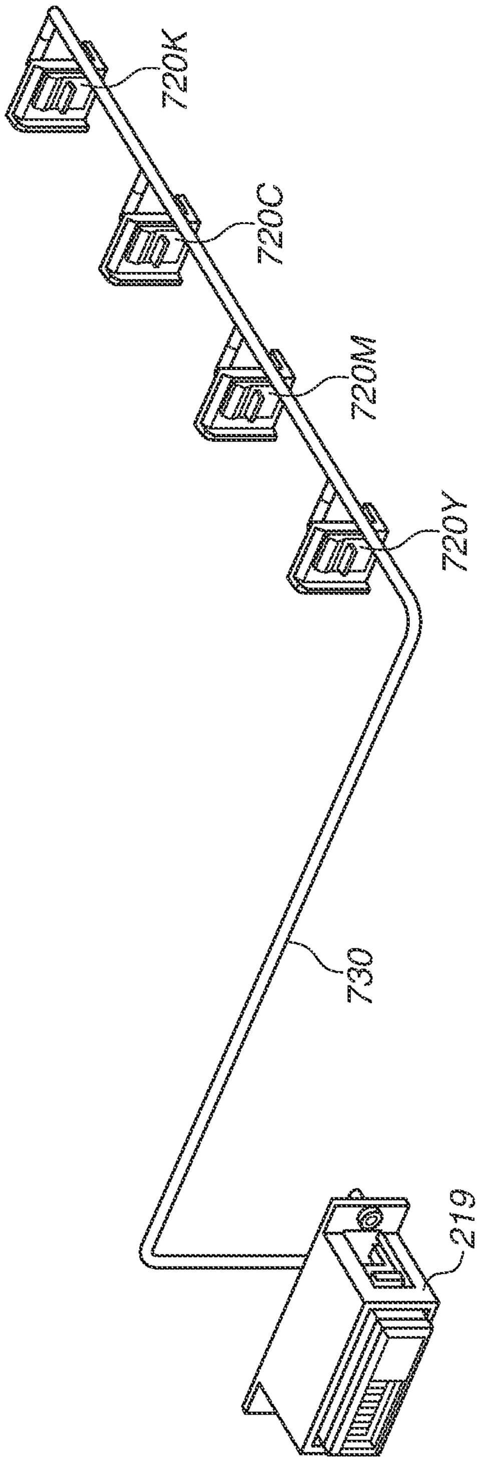
FIG. 6 is an example of a perspective view of a tray contact unit and the tray memory contacts corresponding to the respective developing cartridges.

FIG. 6 is a perspective view illustrating a tray contact unit 219 and the memory contacts 720Y, 720M, 720C, and 720K corresponding to the developing cartridges, respectively. As illustrated in FIGS. 5A and 6, the tray contact unit 219 is attached to the front surface 30*f*. The memory contacts 720Y, 720M, 720C, and 720K are attached to the inner side of the right side surface 30*r* in the D1 direction.

The memory contacts 720Y, 720M, 720C, and 720K are located where the memory contacts 720Y, 720M, 720C, and 720K can be connected to electrical contacts of the memory tags 81Y, 81M, 81C, and 81K (see FIG. 3) of the developing cartridges 8Y, 8M, 8C, and 8K, respectively. The memory contacts 720Y, 720M, 720C, and 720K are electrically connected to the tray contact unit 219 through a wiring unit 730.

[Attachment and Detachment of Cartridge Tray]

Figure 7A:
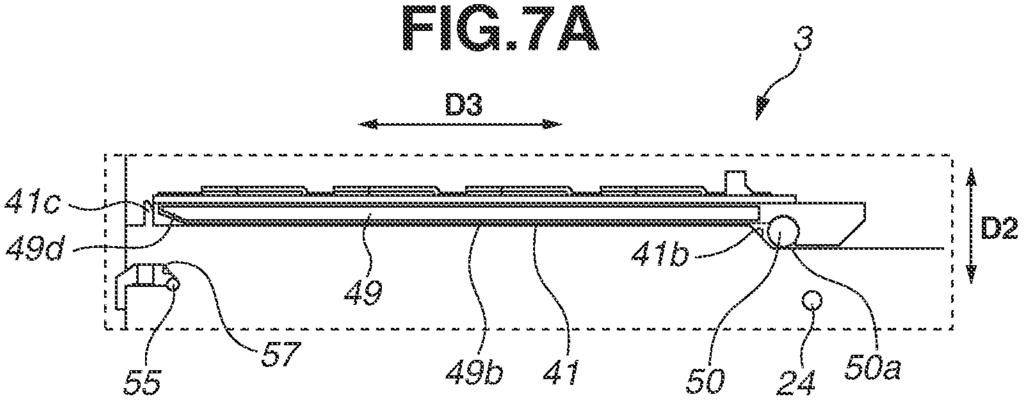
FIG. 7A is an example of a side view of the image forming apparatus with the cartridge tray attached.
Figure 7B:
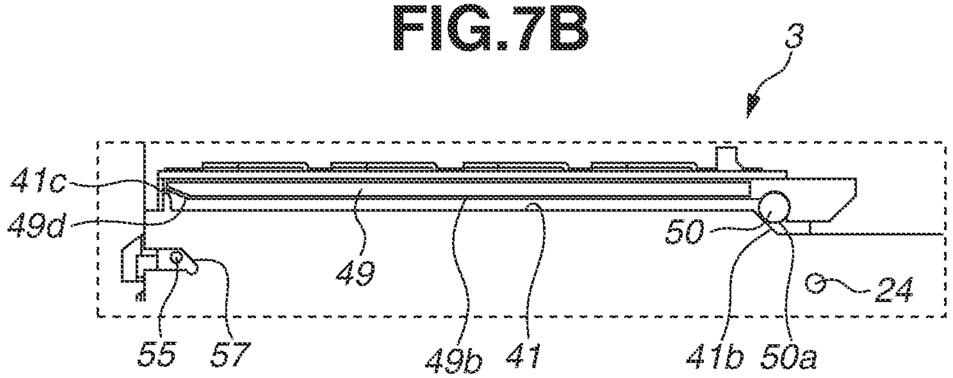
FIG. 7B is an example of a side view of the image forming apparatus with the cartridge tray pulled outward.
Figure 7C:
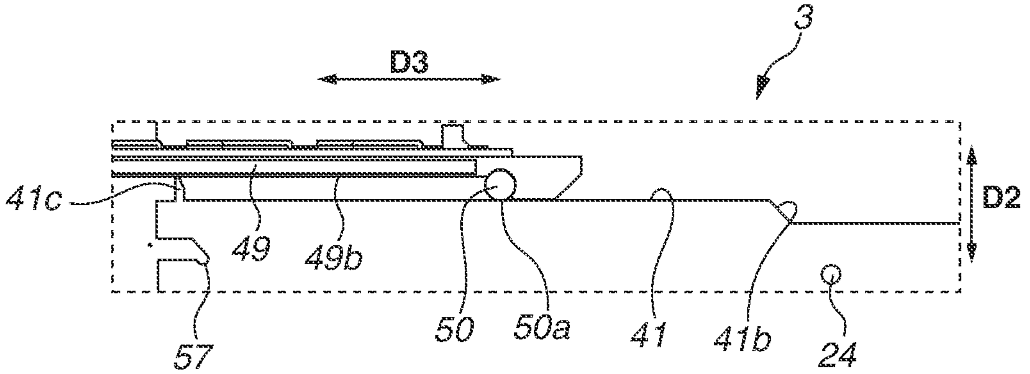
FIG. 7C is an example of a side view of the image forming apparatus with the cartridge tray further pulled outward from the position of FIG. 7B.

Next, a pull-out operation (attaching and detaching operation) of the cartridge tray 3 from the apparatus main body 2 will be described with reference to FIGS. 2A, 2B, 5A, and 7A to 7C. FIGS. 7A to 7C are diagrams illustrating the behavior of the cartridge tray 3 being pulled out of the apparatus main body 2. FIGS. 7A to 7C illustrate the transition state of the cartridge tray 3 and the apparatus main body 2 as seen from the right side of the image forming apparatus 1.

As illustrated in FIG. 5A, tray guides 49 (to-be-guided portions) protruding outward in the D1 direction are formed on the respective right and left side surface 30*r* and 301 (the one on the left side surface 301 is not illustrated). Guide rollers 50 behind the respective tray guides 49 are rotatably supported on the tray frame 30.

As illustrated in FIG. 7A, the lowest portions 50*a* of the guide rollers 50 are located below the tray guides 49. The end portions of the tray guides 49 in the front of the image forming apparatus 1 have slopes 49*d*. The slopes 49*d* are tilted up toward the front side ends of the tray guides 49.

As illustrated in FIG. 2B, the guide rails 41 (main body guide portions) are located on both side surfaces of the portion of the apparatus main body 2 in which the cartridge tray 3 is accommodated. The guide rails 41 support guide lower portions 49*b* (first protrusions) of the tray guides 49 from under the guide lower portions 49*b* while the cartridge tray 3 is being moved from the first position to the second position.

As illustrated in FIG. 7A, the guide rails 41 have rail slopes 41*b* in the back of the image forming apparatus 1. The rail slopes 41*b* are tilted down toward the back side ends. Tray stoppers 41*c* protruding upward from the bottom surfaces of the guide rails 41 are formed on the end portions of the guide rails 41 in the front of the image forming apparatus 1.

As illustrated in FIG. 7A, the position of the cartridge tray 3 attached to the apparatus main body 2 is referred to as the first position. With the cartridge tray 3 at the first position, the guide rollers 50 are located upstream of the rail slopes 41*b* in the pull-out direction of the cartridge tray 3. The tray guide slopes 49*d* are located upstream of the tray stoppers 41*c* in the pull-out direction of the cartridge tray 3. In replacing the developing cartridges 8Y, 8M, 8C, and 8K, the user opens the front door 40 from the image forming apparatus 1 and pulls the cartridge tray 3 out of the apparatus main body 2 forward from the first position.

Here, as illustrated in FIG. 7B, the slopes 49*d* come into contact with the tray stoppers 41*c*, and the guide rollers 50 come into contact with the rail slopes 41*b*. As the cartridge tray 3 is pulled to the front side of the image forming apparatus 1, the cartridge tray 3 moves from the apparatus main body 2 up in the D2 direction.

This separates the photosensitive drums 4Y, 4M, 4C, and 4K from the electrostatic attraction belt 12, allowing the cartridge tray 3 to be pulled out without damaging the surfaces of the photosensitive drums 4Y, 4M, 4C, and 4K. As illustrated in FIG. 7C, the position of the cartridge tray 3 when the cartridge tray 3 being pulled out of the apparatus main body 2 forward from the first position has fully ascended in the D2 direction is referred to as the second position.

With the cartridge tray 3 at the second position or at a position beyond the second position forward, the lower portions 49*b* of the tray guides 49 are in contact with the tray stopper 41*c*, and the guide rollers 50 are in contact with the guide rails 41. The cartridge tray 3 is thus pulled out of the apparatus main body 2 forward in the D3 direction with its position in the D2 direction maintained. After the cartridge tray 3 is pulled out, the user can easily replace the developing cartridges 8Y, 8M, 8C, and 8K as the upper part of the cartridge tray 3 is open, the upper direction of which is in which the developing cartridges 8Y, 8M, 8C, and 8K are taken out.

In inserting the pulled-out cartridge tray 3 into the apparatus main body 2, the cartridge tray 3 passes the second position and moves to the first position in reverse order to that in the pull-out operation. Even in such a case, the photosensitive drums 4 and the electrostatic attraction belt 12 are separated until the cartridge tray 3 comes to the first position. The insertion of the cartridge tray 3 can thus be completed without damaging the surfaces of the photosensitive drums 4.

[Opening and Closing of Front Door]

Figure 8A:
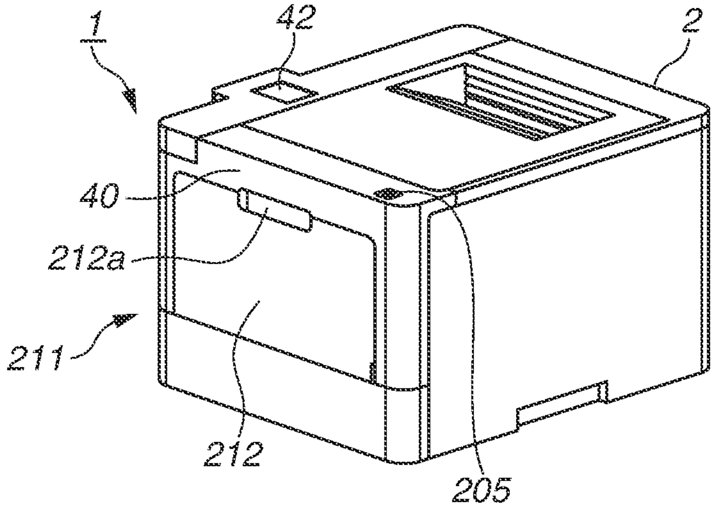
FIG. 8A is an example of a perspective view of the image forming apparatus with its front door at a closed position.
Figure 8B:
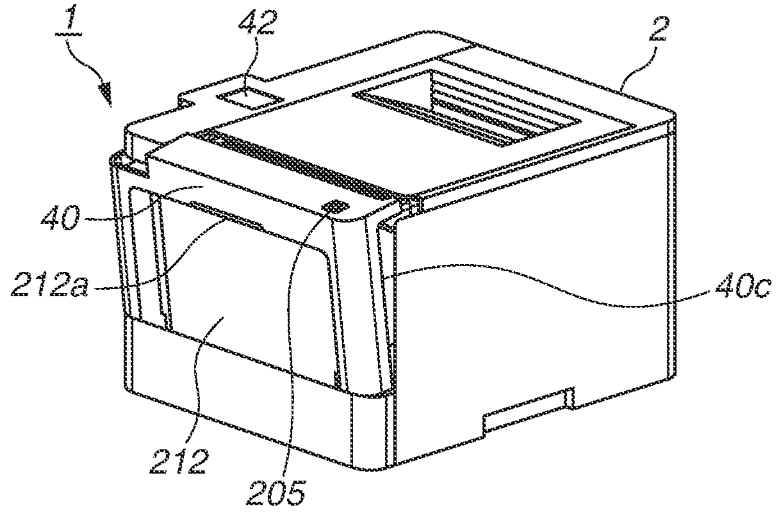
FIG. 8B is an example of a perspective view of the image forming apparatus with the front door located between the closed position and the open position.
Figure 8C:
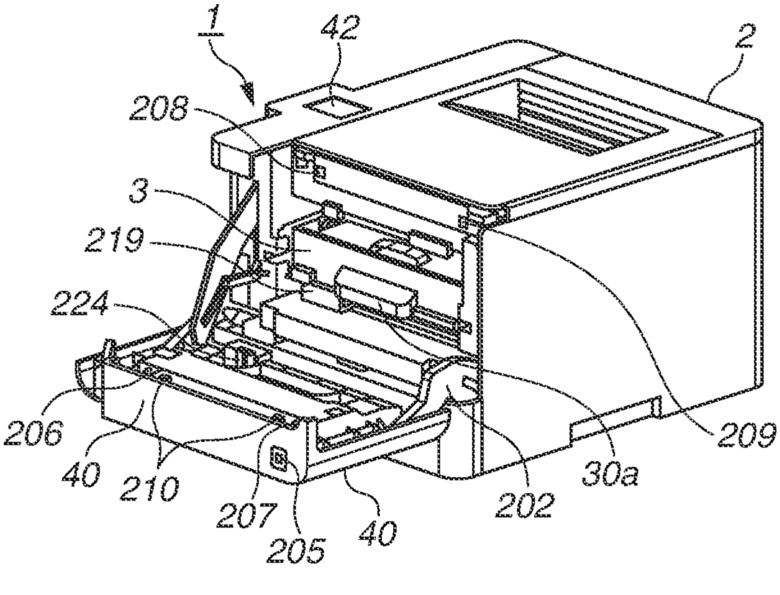
FIG. 8C is an example of a perspective view of the image forming apparatus with the front door at the open position.

Next, the opening and closing operation of the front door 40 will be described with reference to FIGS. 8A to 8C and 9. FIGS. 8A to 8C are perspective views illustrating the image forming apparatus 1 in opening and closing the front door 40 stepwise. FIG. 9 is a perspective view illustrating a configuration of the front door 40.

As illustrated in FIG. 9, a left hinge 201 and a right hinge 202 are attached to the front door 40. The left and right hinges 201 and 202 are located at different positions in the D1 direction. The left hinge 201 has a left hinge rotation shaft 201*a*. The right hinge 202 has a right hinge rotation shaft 202*a*. The apparatus main body 2 includes a left hinge support portion 203 and a right hinge support portion 204, which are engaged with the left hinge rotation shaft 201*a* and the right hinge rotation shaft 202*a*, respectively. The front door 40 is supported by the apparatus main body 2 rotatably about the left hinge rotation shaft 201*a* and the right hinge rotation shaft 202*a*.

The front door 40 includes an opening and closing button 205, a left lock member 206, and a right lock member 207. The apparatus main body 2 includes a left lock member holding portion 208 and a right lock member holding portion 209. With the front door 40 closed, the left lock member 206 is engaged with the left lock member holding portion 208, and the right lock member 207 is engaged with the right lock member holding portion 209. The engagement keeps the front door 40 at the position of being closed to the apparatus main body 2. The front door 40 further includes front door biasing members 210. With the front door 40 closed, the front door biasing members 210 apply biasing force to the front door 40 and the apparatus main body 2. The biasing force biases the front door 40 in the direction of opening from the apparatus main body 2.

To open the front door 40, the user initially presses the opening and closing button 205 (in the state of FIG. 8A). The pressing of the opening and closing button 205 moves the left and right lock members 206 and 207 via a not-illustrated link mechanism, disengaging the left and right lock members 206 and 207 from the left and right lock member holding portions 208 and 209, respectively. With the left and right lock members 206 and 207 disengaged, the biasing force of the front door biasing members 210 rotates the front door 40 from the position of FIG. 8A to the position of FIG. 8B about the left hinge rotation shaft 201*a* and the right hinge rotation shaft 202*a*.

The movement to this position enables the user to grip an edge portion 40*c* (FIG. 9) of the front door 40. The user can operate the end portion 40*c* to open the front door 40 to the position approximately 90° rotated from the closed state as illustrated in FIG. 8C. The right hinge 202 is equipped with a tension spring 306 (see FIG. 9). The tension spring 306 eases impact when the user opens the front door 40.

The left hinge 201 and the right hinge 202 include a not-illustrated left hinge stopper portion and right hinge stopper portion, respectively. When the front door 40 is rotated to the position of FIG. 8C, the left hinge stopper portion and the right hinge stopper portion come into contact with not-illustrated stoppers on the apparatus main body 2. The front door 40 is thereby prevented from opening further and retained at this position. In closing the front door 40, the front door 40 is rotated in reverse order, and the left and right lock members 206 and 207 are engaged with the left and right lock member holding portions 208 and 209. This brings the front door 40 into the closed state.

Figure 10A:
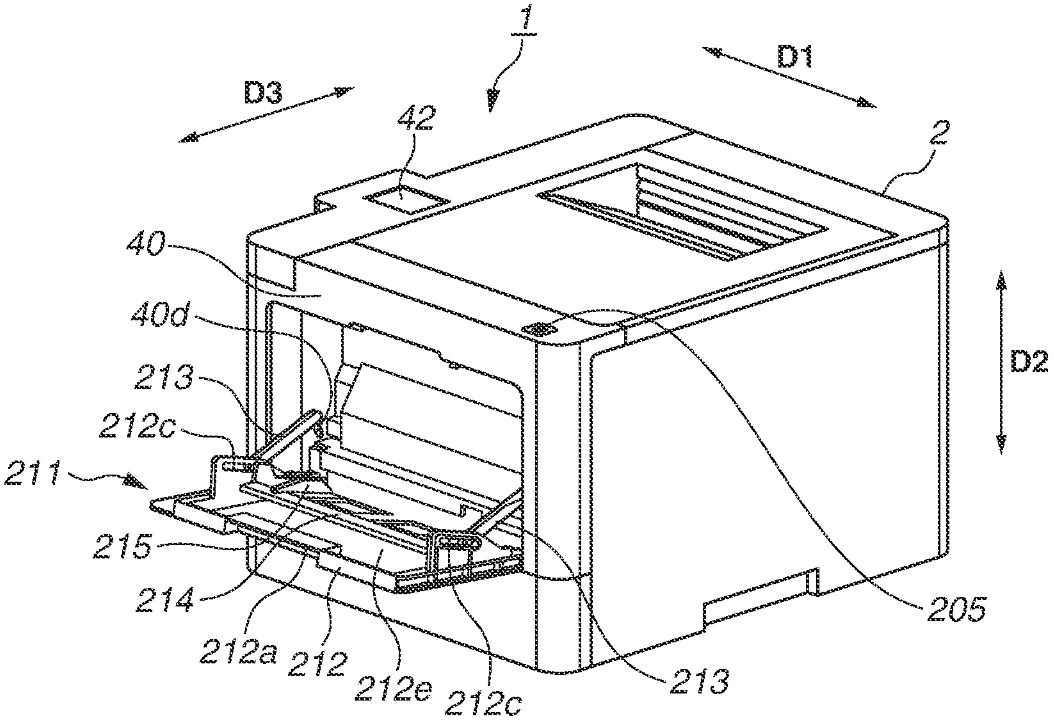
FIG. 10A is an example of a perspective view of a multi-tray unit in use.
Figure 10B:
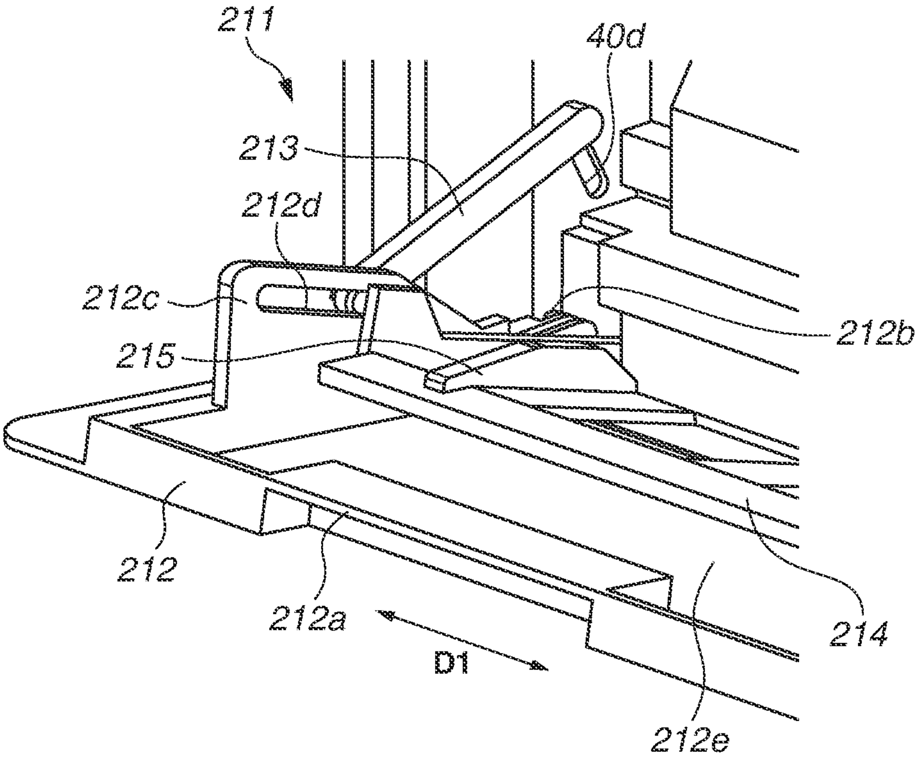
FIG. 10B is an example of an enlarged perspective view illustrating the multi-tray unit.

As illustrated in FIGS. 10A and 10B, a width regulation plate 215 is supported by a multi-tray frame 212 movably in the D1 direction. The user places sheets on a stacking surface 212*e* of the multi-tray frame 212 and a multi-tray 214. The position of the sheets in the D1 direction is regulated by the width regulation plate 215. During image formation, the sheets placed on the multi-tray 214 are feed by a feed roller 216 (see FIG. 1)

[Configuration of Contact Unit]

Figure 11:
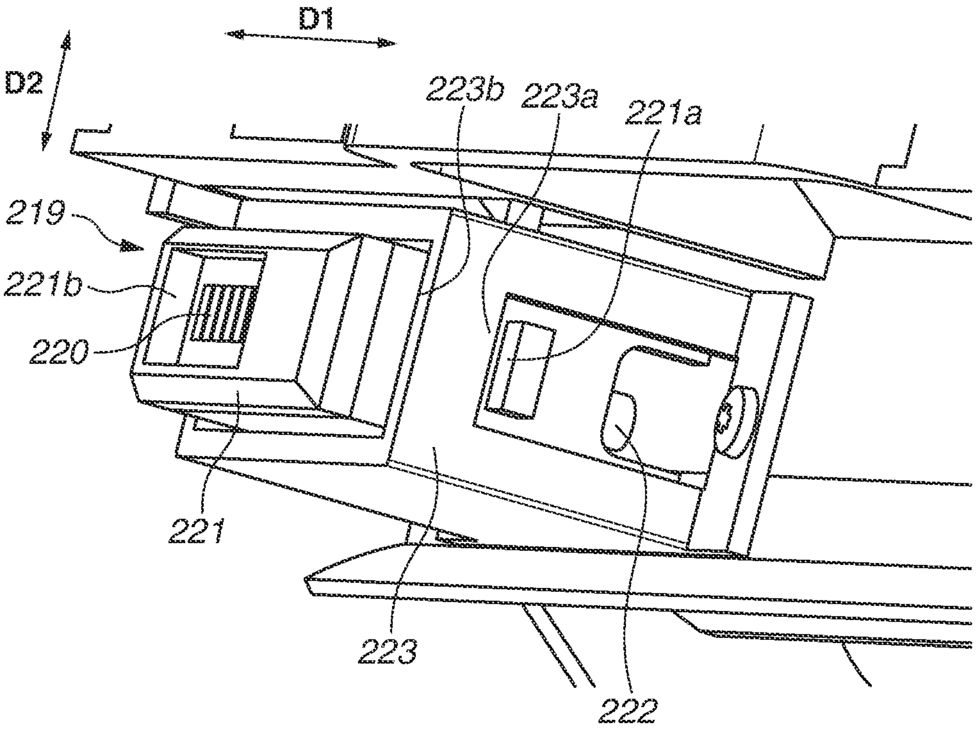
FIG. 11 is an example of an enlarged perspective view of the tray contact unit.

Next, the tray contact unit 219 will be described with reference to FIGS. 5A, 6, and 11. FIG. 11 is an enlarged perspective view illustrating the tray contact unit 219. As described above, when the developing cartridge 8Y is attached to the cartridge tray 3, the memory tag 81Y of the developing cartridge 8Y is electrically connected to the memory contact. The same applies to the developing cartridges 8M, 8C, and 8K.

As illustrated in FIG. 5A, the tray contact unit 219 is located on the front surface 30*f* of the cartridge tray 3. The tray contact unit 219 is located on the end surface of the tray frame 30 of the cartridge tray 3 downstream in the direction in which the cartridge tray 3 is pulled out of the apparatus main body 2 in the D3 direction.

As illustrated in FIG. 11, the tray contact unit 219 includes a contact board 220 (unit electrical contact), a contact board holding member 221, a contact board pressing spring 222, and a contact frame 223. The contact board 220 is fixed to the contact board holding member 221 using a method such as adhesion, double-sided tape, thermally fixing, and insertion. The contact board pressing spring 222 is a compression spring. The contact board pressing spring 222 in a compressed state is in contact with the contact board holding member 221 and the cartridge tray 3. Holding member restriction portions 221*a* of the contact board holding member 221 are held in contact with tray contact frame restriction portions 223*a* of the tray contact frame 223 by the restoring force of the contact board pressing spring 222. The tray contact frame 223 is fixed to the cartridge tray 3.

The tray contact frame 223 includes a float holding portion 223*b*. The float holding portion 223*b* has four sides surrounding the contact board holding member 221. The float holding portions 223*b* and the contact board holding member 221 are arranged with clearance therebetween, allowing the contact board holding member 221 held by the tray contact frame 223 to be moved a certain amount in the D1, D2, and D3 directions.

[Peripheral Configuration of Door Contact Unit]

Figure 12:
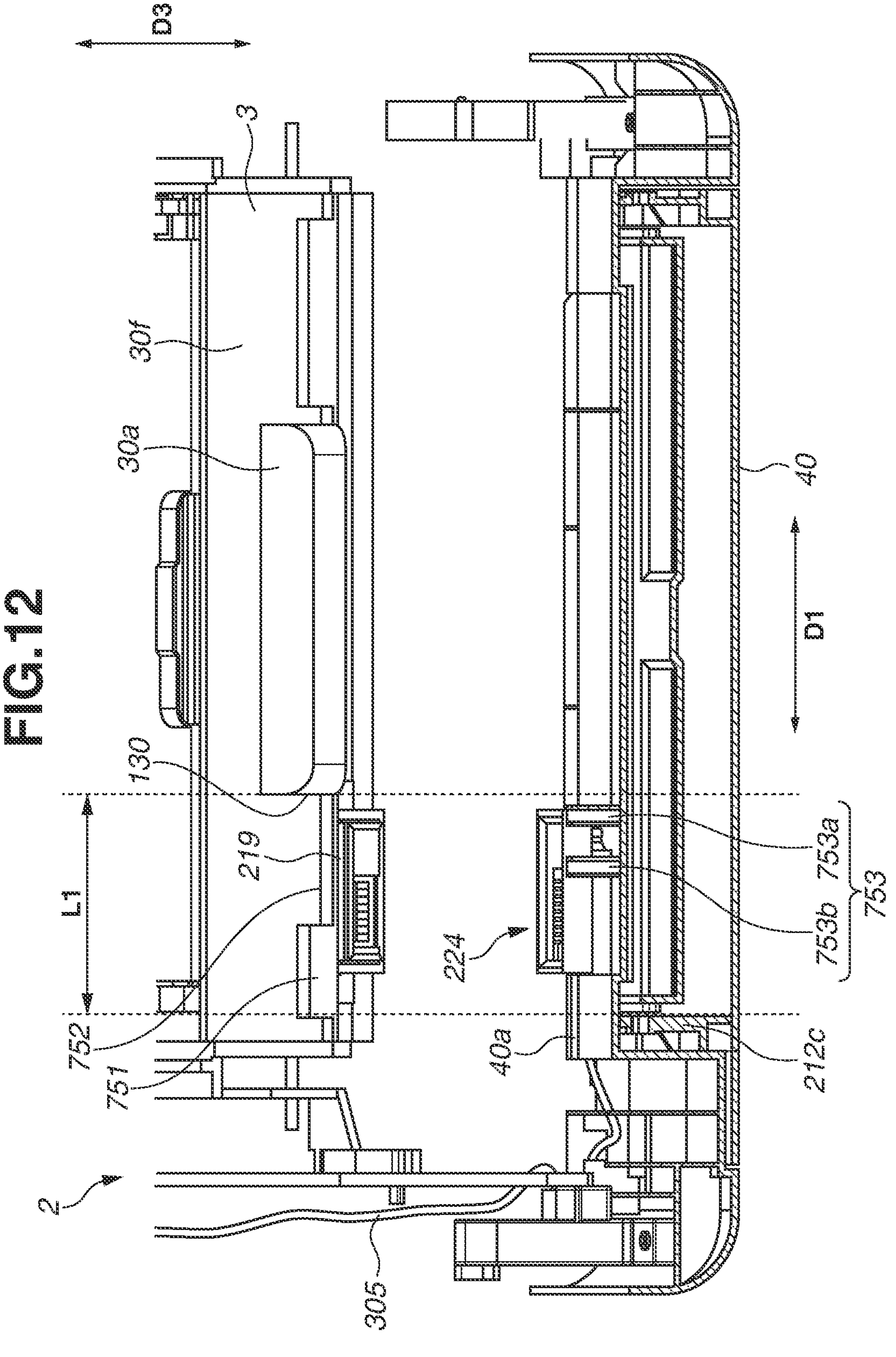
FIG. 12 is an example of a diagram illustrating a door contact unit and the tray contact unit.
Figure 13:
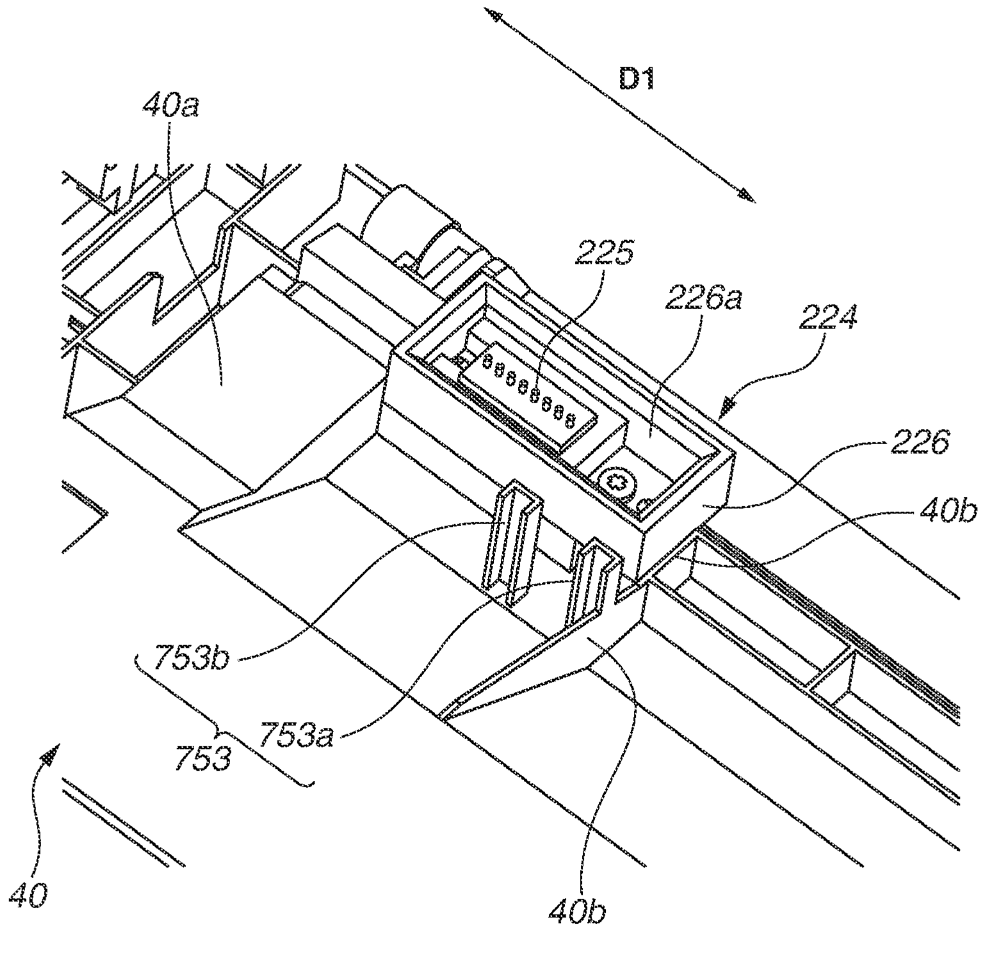
FIG. 13 is an example of a perspective view illustrating the door contact unit and a peripheral configuration thereof.

Next, a peripheral configuration of a door contact unit 224 located on the front door 40 will be described with reference to FIGS. 12 and 13. FIG. 12 is a diagram illustrating a positional relationship between the door contact unit 224 and the tray contact unit 219 on the cartridge tray 3. FIG. 13 is a perspective view illustrating the door contact unit 224 and a configuration surrounding the door contact unit 224.

As illustrated in FIGS. 12 and 13, the door contact unit 224, serving as a door contact, is located in contact with and electrically connected to the tray contact unit 219 on the cartridge tray 3 as the front door 40 is closed.

The door contact unit 224 is located in the area in the front door 40 facing the tray contact unit 219 as the front door 40 is at the closed position.

The door contact unit 224 includes a door contact holder 226 fixed to the front door 40 and a door contact member 225 (main body electrical contact) held by the door contact holder 226. The door contact unit 224 (door contact member 225) is located on the front door 40 facing the contact board 220 of the cartridge tray 3 as the front door 40 is at the closed position.

The door contact holder 226 has a box shape open to the apparatus main body 2. The door contact member 225 is accommodated in the door contact holder 226. The edges of the door contact holder 226 constitute contact positioning portions 226*a* tapered toward the door contact member 225. The contact positioning portions 226*a* position the tray contact unit 219 as the front door 40 is closed. The door contact member 225 includes metal contact portions, which are connected to bundled wires 305 (see FIG. 12) located in the left part of the apparatus main body 2.

[Contact Operation of Door Contacts]

Figure 14:
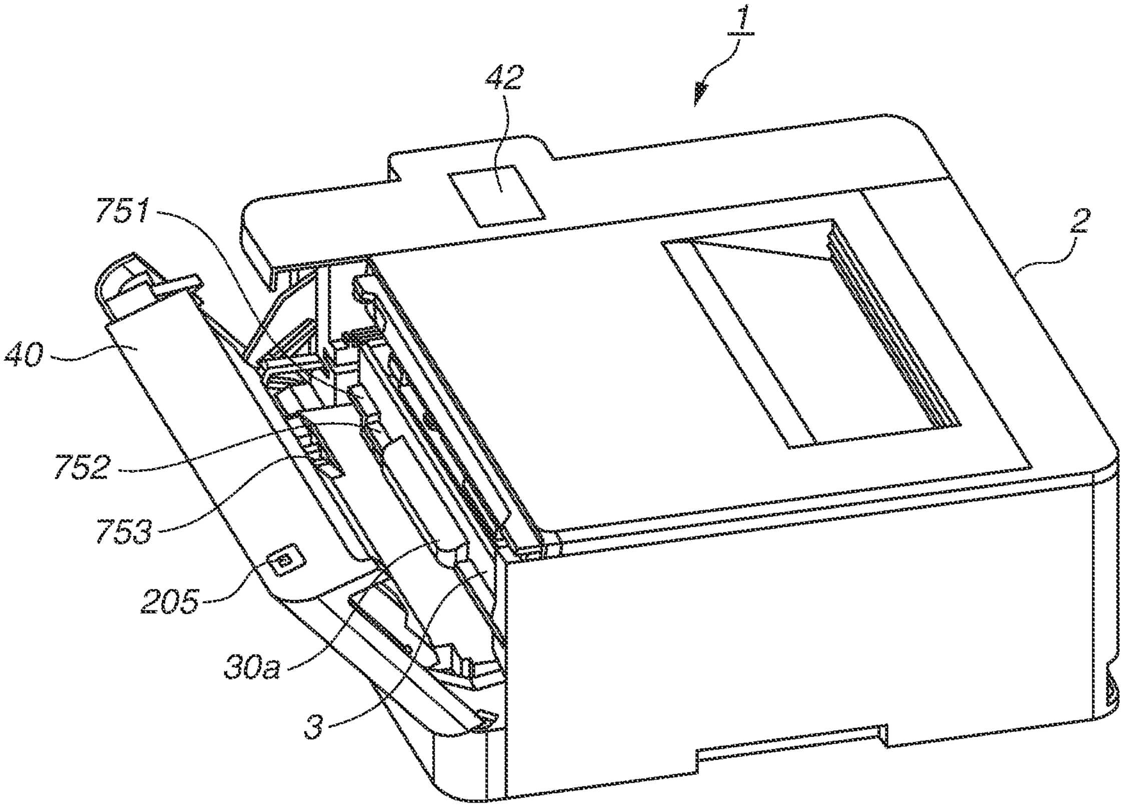
FIG. 14 is an example of a perspective view illustrating the image forming apparatus while the front door is being closed.
Figure 15:
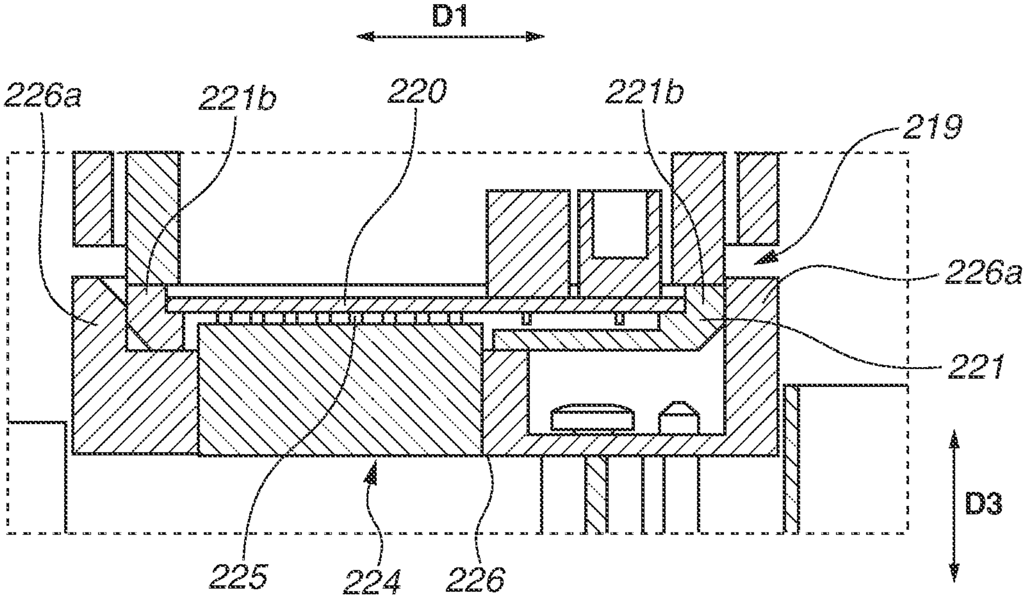
FIG. 15 is an example of a cross-sectional view of the door contact unit and the tray contact unit connecting to each other.

Next, an operation of the door contact unit 224 coming into contact with the tray contact unit 219 will be described with reference to FIGS. 14 and 15. FIG. 14 is a perspective view illustrating the image forming apparatus 1 in the process of closing the front door 40. FIG. 15 is a cross-sectional view illustrating the condition of the door contact unit 224 in contact with the tray contact unit 219.

With the front door 40 at the open position, the door contact member 225 is separated from the tray contact unit 219 (contact portions on the contact board 220). As the front door 40 is closed from the open state, contact to-be-positioned portions 221*b* of the contact board holding member 221 come into engagement with the contact positioning portions 226*a* of the door contact holder 226 as illustrated in FIGS. 14 and 15. The contact board holding member 221, which is held movably a certain distance in the D1 and D2 directions as described above, is restricted in movement in the D1 and D2 directions by the engagement. The restriction aligns the contact board 220 held by the contact board holding member 221 and the door contact member 225 held by the door contact holder 226 in the D1 and D2 directions. With the front door 40 thus closed, the contact portions on the contact board 220 are in contact with and electrically connected to the contact portions on the door contact member 225.

In the present exemplary embodiment, the movement of the tray contact unit 219 in the D1 and D2 directions is restricted by the door contact unit 224. However, the configuration is not limited to that. For example, in one or more embodiments, the contact board holding member 221 of the door contact unit 224 is configured to be movable in the D1 and D2 directions while the movement of the contact board holding member 221 is restricted by the tray contact unit 219. The contact configuration is not limited to the boards. In some embodiments, other configurations such as springs and metal wires are used.

[Wiring of Cartridge Tray]

Figure 16A:
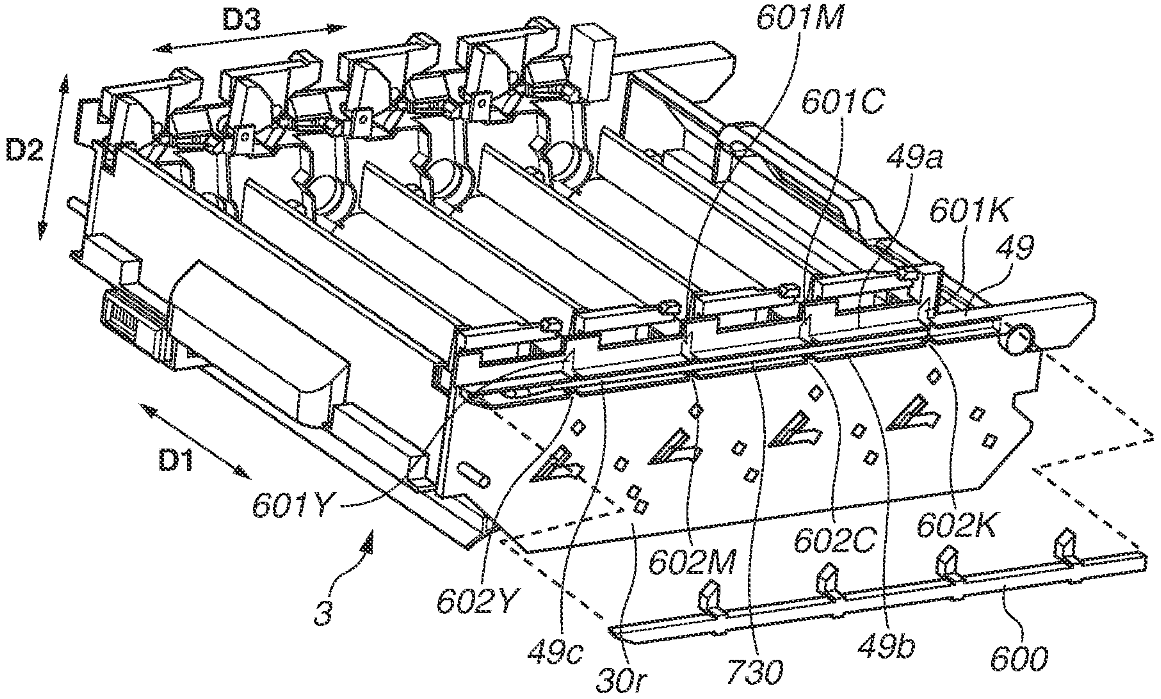
FIG. 16A is an example of a perspective view of the cartridge tray.
Figure 16B:
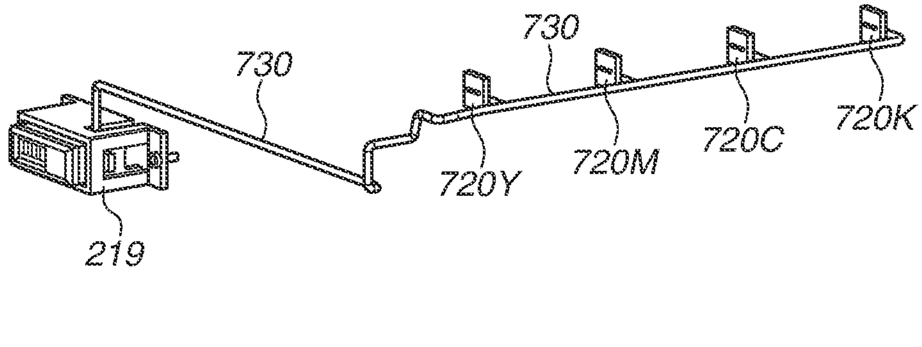
FIG. 16B is an example of a perspective view of a wiring unit.

Next, the wiring of the cartridge tray 3 will be described with reference to FIGS. 16A, 16B, 17A, 17B, 18A to 18C, 19A, and 19B. FIG. 16A is a perspective view of the cartridge tray 3, and illustrates a state where a lid member 600 is detached from the tray guide 49. FIG. 16B illustrates a wiring unit 730 (line conductors, a cable, or wires) electrically connecting the memory contacts 720Y, 720M, 720C, and 720K (intermediate electrical contacts) included in the cartridge tray 3 to the tray contact unit 219.

As illustrated in FIG. 16A, the cartridge tray 3 includes the tray guides 49 (to-be-guided portions). The tray guide 49 on the right side surface 30*r* includes a guide upper portion 49*a* (second protrusion) in addition to the foregoing guide lower portion 49*b* (first protrusion). The guide upper portion 49*a* is located above the guide lower portion 49*b*. The guide upper portion 49*a* and the guide lower portion 49*b* have a recess 49*c* (see FIG. 18B) therebetween. The wiring unit 730 is located in the recess 49*c* extending in the D3 direction. The lid member 600 (cover) is attached in the D1 direction to close the opening of the recess 49*c* between the guide upper portion 49*a* and the guide lower portion 49*b*. The lid member 600 is attached to the tray guide 49 by means such as press-in, adhesion, welding, and not-illustrated retainers.

The lid member 600 has a U-shaped cross section orthogonal to the D3 direction. The opening of the U shape is directed toward the right side surface 30*r* of the tray frame 30 of the cartridge tray 3, and at least part of the lid member 600 is inserted in the recess 49*c*. The wiring unit 730 is surrounded by the guide upper portion 49*a*, the guide lower portion 49*b*, and the lid member 600.

The right side surface 30*r* of the cartridge tray 3 has insertion holes 601Y, 601M, 601C, and 601K corresponding to the memory contacts 720Y, 720M, 720C, and 720K, respectively. The insertion holes 601Y, 601M, 601C, and 601K are open to the outside in the D1 direction. The insertion holes 601Y, 601M, 601C, and 601K extend upward in the D2 direction beyond the guide upper portion 49*a*.

The guide lower portion 49*b* has recesses 602Y, 602M, 602C, and 602K (see FIGS. 16A and 18A). The recesses 602Y, 602M, 602C, and 602K are open to the outside in the D1 direction.

Figure 17A:
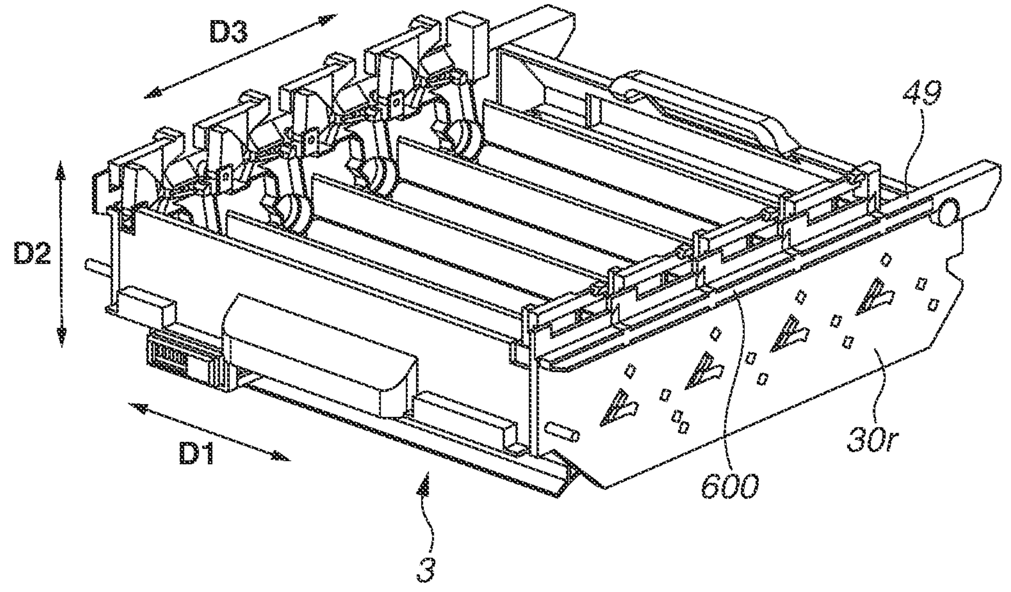
FIG. 17A is an example of a perspective view of the cartridge tray.
Figure 17B:
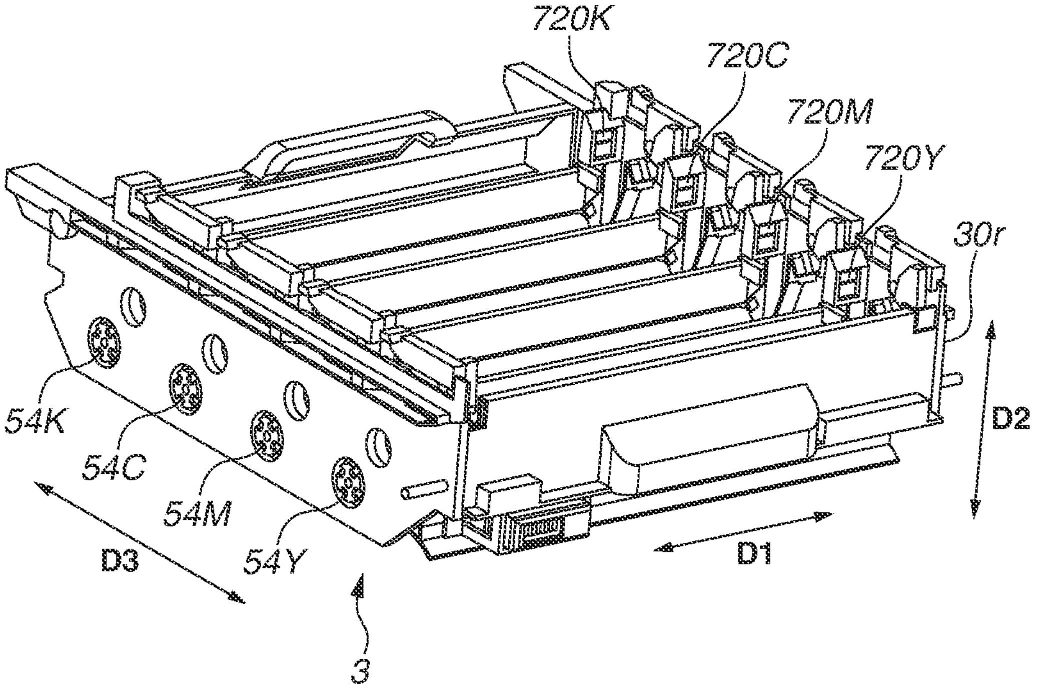
FIG. 17B is an example of a perspective view of the cartridge tray seen in a different point of view from the view of FIG. 17A.

FIGS. 17A and 17B illustrate perspective views of the cartridge tray 3. FIG. 17A illustrates a state where the lid member 600 is attached to the tray guide 49. As illustrated in FIG. 17B, the memory contacts 720Y, 720M, 720C, and 720K are located on the inner side of the right side surface 30*r* in the D1 direction. The memory contacts 720Y, 720M, 720C, and 720K are located in the right part of the cartridge tray 3 in the D1 direction. The drum driving couplings 54Y, 54M, 54C, and 54K are located on the left side in the D1 direction.

FIG. 18A is a right side view of the cartridge tray 3. As illustrated in FIG. 18A, the lid member 600 is fitted in the recess 49*c* formed between the guide upper portion 49*a* and the guide lower portion 49*b*. In some embodiments, the width of the recess 49*c* in the D2 direction ranges from 5 mm to 10 mm. The tray developing contacts 610Y, 610M, 610C, and 610K, the first tray charging contacts 611Y, 611M, 611C, and 611K, and the second tray charging contacts 612Y, 612M, 612C, and 612K are located in the right side surface 30*r*. The first tray cleaner contacts 613Y, 613M, 613C, and 613K and the second tray cleaner contact 614 are also located in the right side surface 30*r*.

FIG. 18B is a cross-sectional view taken along the line X1-X1 of FIG. 18A. As illustrated in FIG. 18B, the lid member 600 includes a first portion 600*a* in a rectangular shape, having an open side and an internal space. The wiring unit 730 is accommodated in the first portion 600*a* of the lid member 600. The shape of the lid member 600 will be described below with reference to FIGS. 19A and 19B. The lid member 600 has a U-shaped cross-section perpendicular to the D3 direction. At least part of the lid member 600 is inserted in the recess 49*c*, with the opening of the U shape facing the right side surface 30*r*.

FIG. 18C is a conceptual diagram for describing the positional relationship between the first tray charging contact 611Y and the wiring unit 730. As illustrated in FIGS. 18B and 18C, the first tray charging contact 611Y serving as a high voltage contact has an exposed surface 611 Ya on the right outer side in the D1 direction. The portion of the exposed surface 611Ya closest to the wiring unit 730 will be defined as a closest portion P. At least part of the wiring unit 730 is on the right of the closest portion P in the D1 direction. The area formed by the closest portion P and outermost portions of the wiring unit 730 (area formed by points P, Q, and R) will be defined as an area PQR, where point Q is the outermost point and point R is the innermost point in the D1 direction. The guide lower portion 49*b* intersects the line segment PQ. With such a configuration, the guide lower portion 49*b* functions as a shield against electrostatic noise that the wiring unit 730 would receive from the first tray charging contact 611Y without the shield. This allows the reduction of electrostatic noise in the wiring unit 730, improving the stability of electrical communication.

While the present exemplary embodiment has been described with the first tray charging contact 611Y, a similar configuration has a similar effect on the tray developing contacts 610 and the second tray charging contacts 612, as high voltage contacts.

Surrounding the wiring unit 730 by the lid member 600, the guide upper portion 49*a*, and the guide lower portion 49*b* further reduces electrostatic noise, providing a much greater stability of electrical communication.

Figure 19A:
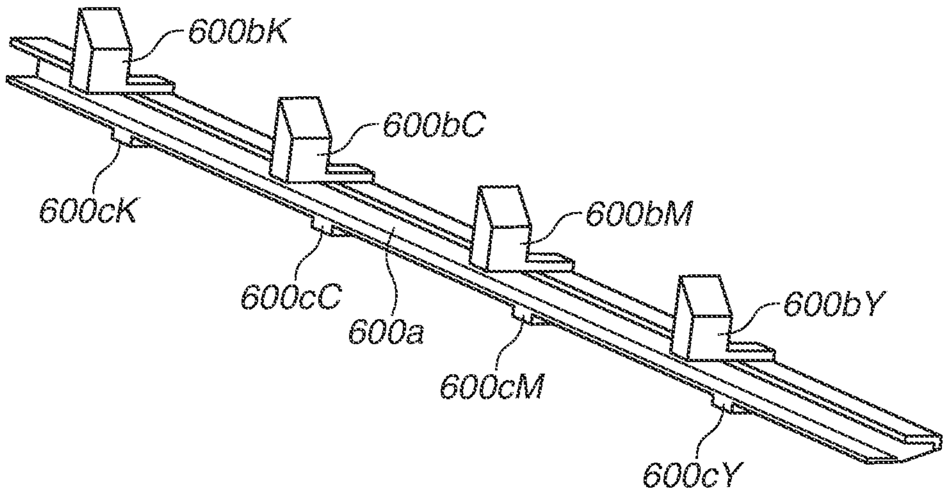
FIG. 19A is an example of a perspective view of a lid member.
Figure 19B:
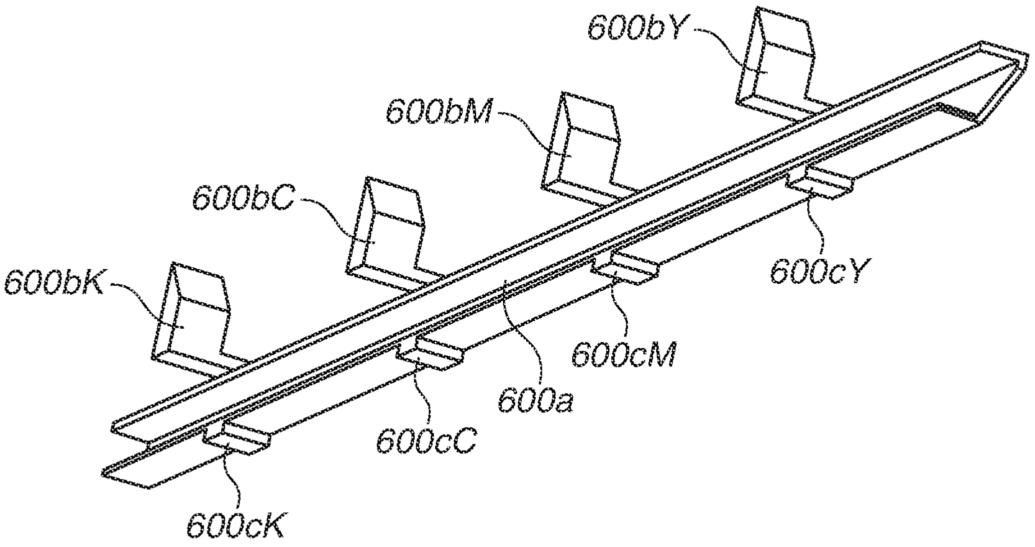
FIG. 19B is an example of a perspective view of the lid member seen in a different point of view from the view of FIG. 19A.

FIGS. 19A and 19B are perspective views of the inner side of the lid member 600. The lid member 600 includes the first portion 600*a*, second portions 600*b*Y, 600*b*M, 600*b*C, and 600*b*K, and third portions 600*c*Y, 600*c*M, 600*c*C, and 600*c*K.

The first portion 600*a* accommodates the wiring unit 730 inside. The second portions 600*b*Y, 600*b*M, 600*b*C, and 600*b*K are inserted into the insertion holes 601Y, 601M, 601C, and 601K (FIG. 16A). The third portions 600*c*Y, 600*c*M, 600*c*C, and 600*c*K are inserted into the recesses 602Y, 602M, 602C, and 602K (FIG. 16A).

Such a structure described above that has the accommodation portion of the tray guide 49 for accommodating the wiring unit 730 open to outside the right side surface 30*r* offers improved workability in putting together the wiring unit 730 and the tray guide 49. As the recesses 602Y, 602M, 602C, and 602K are open outward in the D1 direction, the memory contacts 720Y, 720M, 720C, and 720K and the tray guide 49 are put together with improved workability.

The lid member 600 between the guide upper portion 49*a* and the guide lower portion 49*b* improves the rigidity of the tray guide 49. This prevents deformation of the tray guide 49 in attaching and detaching the cartridge tray 3 to/from the apparatus main body 2, providing a stable operation of attaching and detaching the cartridge tray 3.

The rectangular shape of the lid member 600 between the guide upper portion 49*a* and the guide lower portion 49*b* further offers a higher rigidity of the tray guide 49. Next, a developing cartridge 620 (corresponding to each of the developing cartridges 8Y, 8M, 8C, and 8K) will be described with reference to FIGS. 20, 21A, 21B, and 22.

Figure 20:
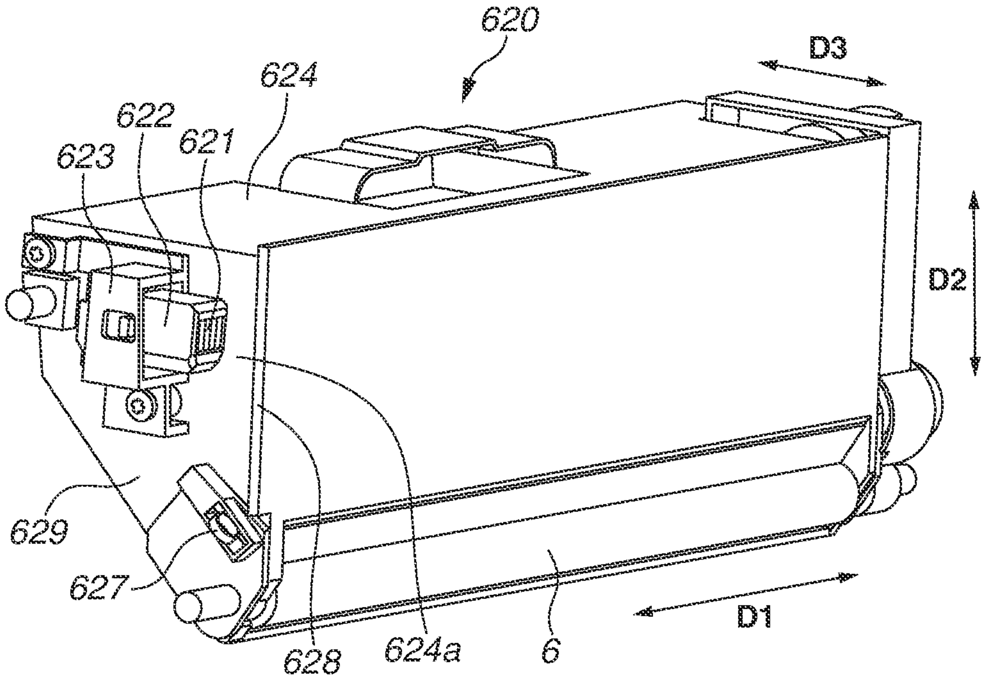
FIG. 20 is an example of a perspective view of the developing cartridge.

FIG. 20 is a perspective view of the developing cartridge 620 seen from behind and right. The developing cartridge 620 serving as a developing unit includes a memory tag unit 622, including a memory tag 621 serving as a memory medium attached thereto. The memory tag 622 is located on the right side of the developing cartridge 620. The electrical contact portions of the memory tag 621 are directed backward. A holding member 623 is integrally fixed to a developing frame 624 (first frame) with screws. The developing frame 624 is a frame rotatably supporting a developing roller 6. The memory tag unit 622 is movably supported with play in the D1, D2, and D3 directions with respect to the holding member 623 and the developing frame 624. The developing frame 624 includes a right side portion 624*a* and a flange portion 628. The flange portion 628 protrudes from the right side portion 624*a* to the right in the D1 direction. In addition, the developing cartridge 620 has a developing roller contact 627 to supply a bias to the developing roller 6 located on the right side portion 624*a*.

Figure 21A:
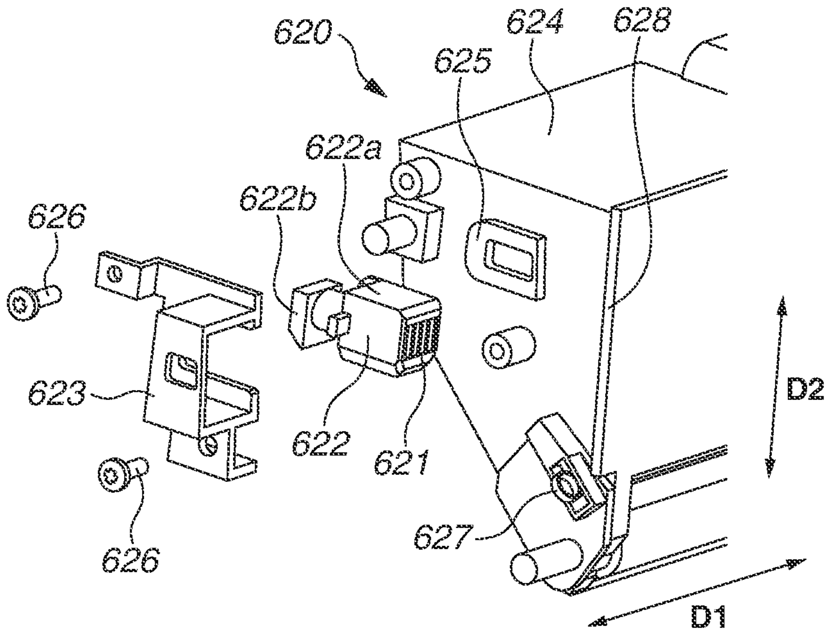
FIGS. 21A and 21B are an examples of exploded perspective views of a longitudinal end portion of the developing cartridge.
Figure 21B:
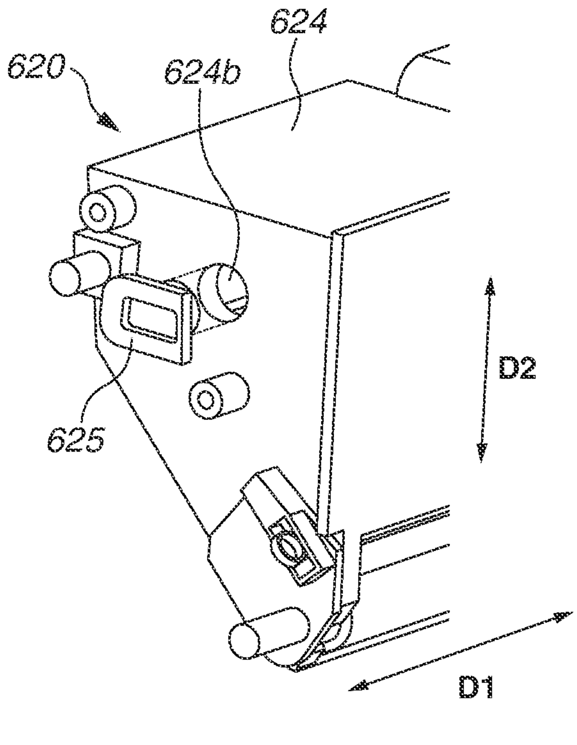

FIGS. 21A and 21B are exploded perspective views of the developing cartridge 620 seen from the behind and to the right. The memory tag unit 622 includes a tag holding portion 622*a* serving as a first member to which the memory tag 621 is fixed, and a pressure receiving portion 622*b* serving as a second member movable relative to the tag holding portion 622*a*.

The holding member 623 is fixed to the developing frame 624 by fixing means such as using screws 626. The developing frame 624 includes a receptor portion 625. The receptor portion 625 is integrally formed on the developing frame 624, and movably holds the memory tag unit 622. The memory tag unit 622 is located in the upper part of the developing cartridge 620 in the D2 direction. The memory tag unit 622 is located above the developing roller contact 627 for applying a bias to the developing roller 6. The memory tag 621 is located highest among the contact members on the right end of the developing cartridge 620 in the D1 direction.

As illustrated in FIG. 21B, the receptor portion 625 may be configured as a component separate from the developing frame 624. In such a case, a filling port 624*b* for filling the developer into the developing frame 624 may be configured to be sealed by the receptor portion 625. The receptor portion 625 is located between the developing frame 624 and the memory tag unit 622 in the D1 direction. The memory tag unit 622 is located between the receptor portion 625 and the holding member 623 in the D1 direction. At least, the receptor portion 625, the memory tag unit 622, and the holding member 623 overlap on the developing cartridge 620 seen in the D1 direction. The receptor portion 625 serving as a toner sealing member may be used as a toner sealing member without holding the memory tag unit 622.

Figure 22:
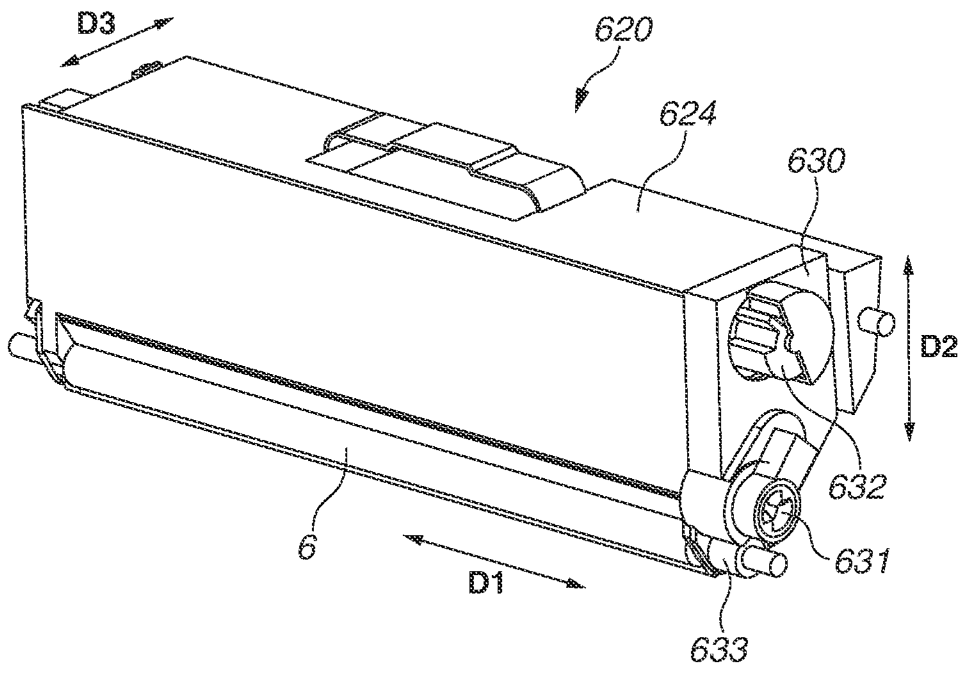
FIG. 22 is an example of a perspective view of the developing cartridge.

FIG. 22 is a perspective view of the developing cartridge 620 seen from the behind and to the left. An end member 630 is integrally fixed to the left end of the developing frame 624 in the D1 direction. Moreover, a developing roller driving coupling 631, a to-be-detected member 632, and a developing roller gear 633 are located on the left end of the developing frame 624 in the D1 direction. The developing roller driving coupling 631 receives driving force from the apparatus main body 2, and transmits the rotational driving force to the developing roller 6, the supply roller 70, the agitation member 71 (see FIG. 4), and the to-be-detected member 632. The to-be-detected member 632 is a rotating member for identifying an unused state and specifications of the developing cartridge 620. The developing roller gear 633 is located on the left end of the developing roller 6 in the D1 direction to rotate integrally with the developing roller shaft. The to-be-detected member 632 is located in the upper end portion of the developing cartridge 620 in the D2 direction. The to-be-detected member 632 is located highest among the rotating members at the left end in the D1 direction.

Figure 23:
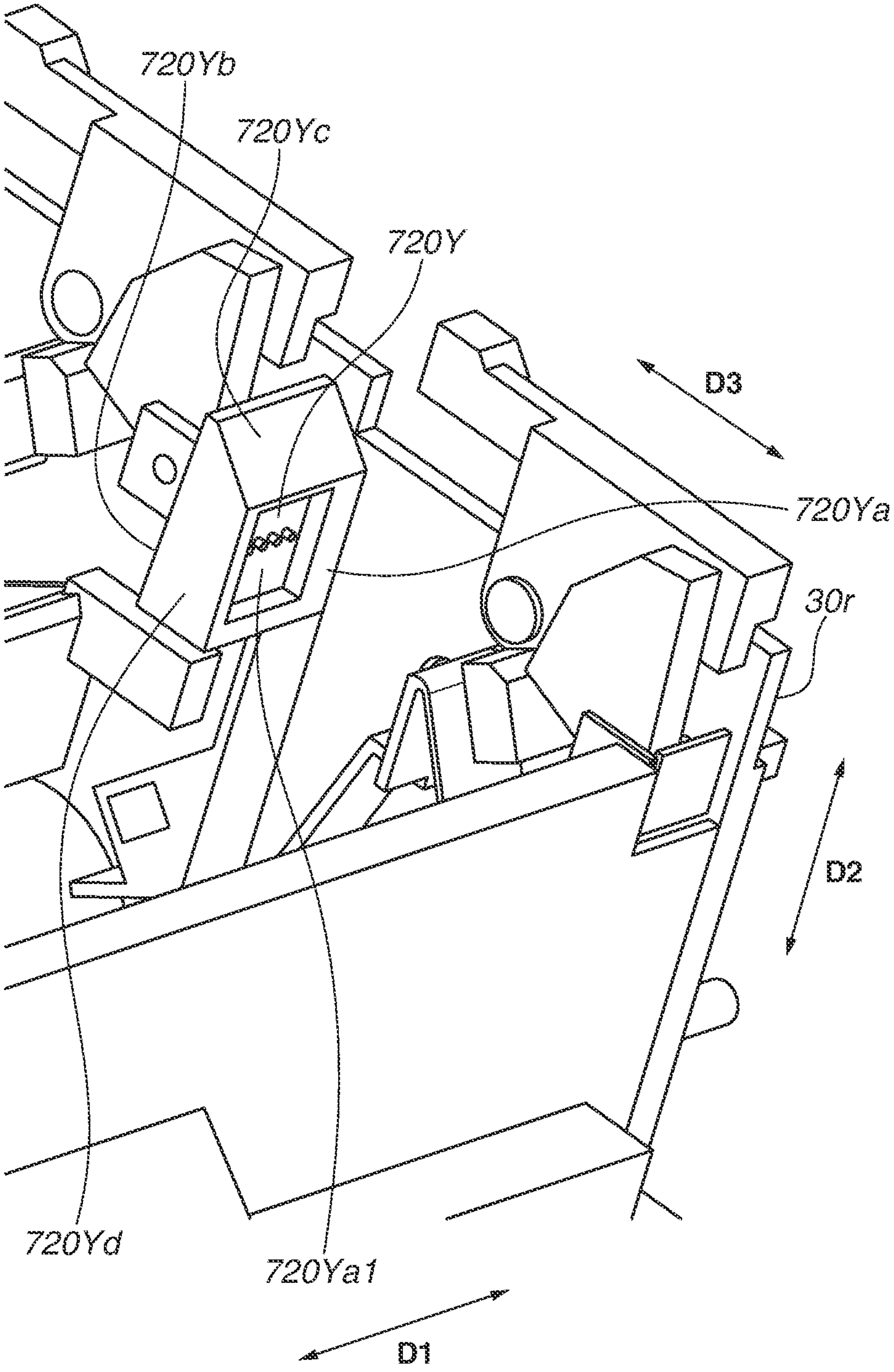
FIG. 23 is an example of a perspective view near a tray memory contact for the cartridge tray.
Figure 24A:
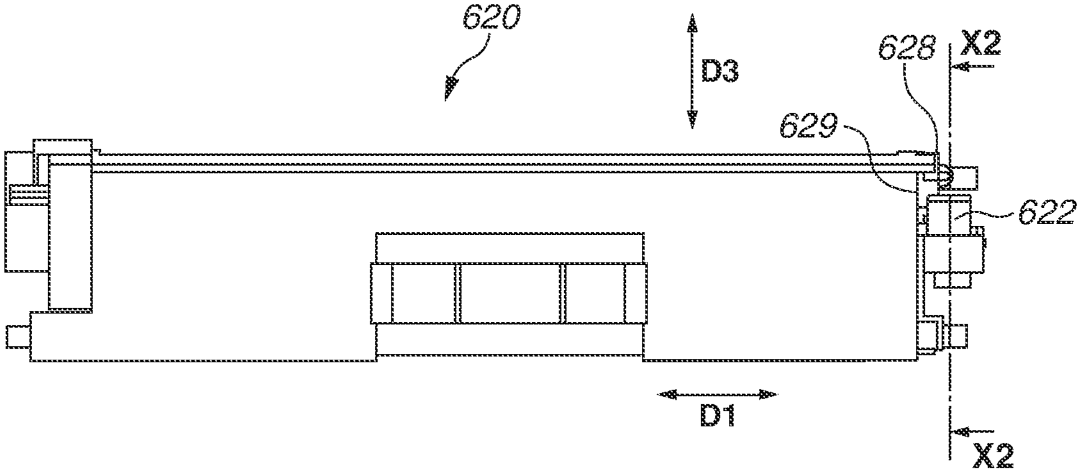
FIG. 24A is an example of a top view of the developing cartridge.
Figure 24B:
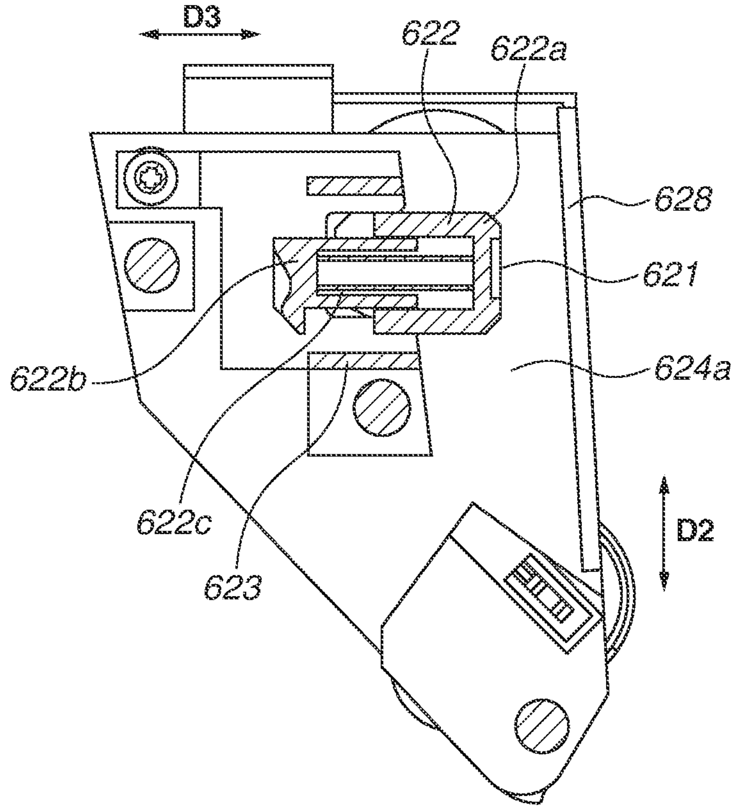
FIG. 24B is an example of a cross-sectional view of the developing cartridge.
Figure 25:
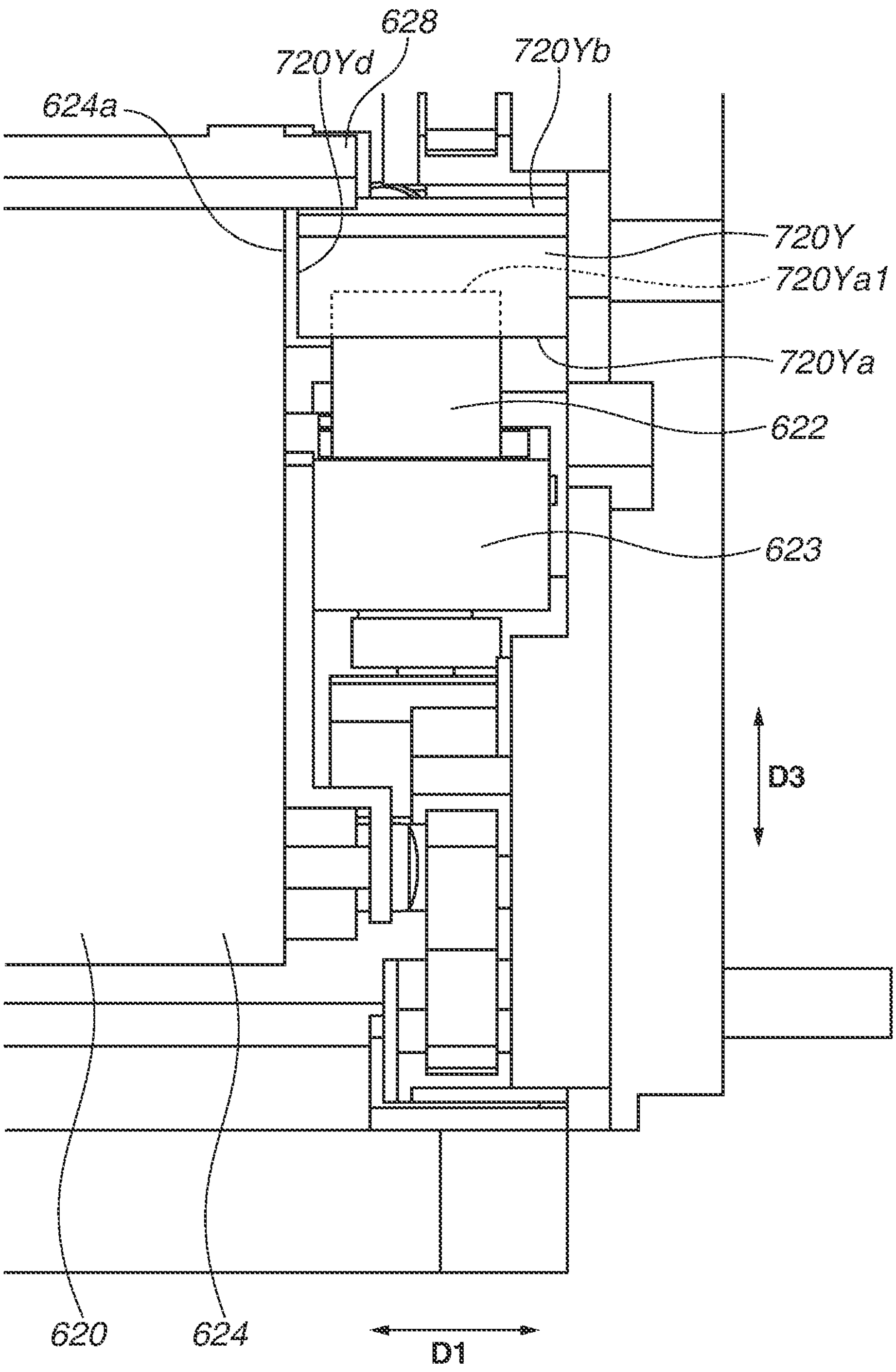
FIG. 25 is an example of a top view near the tray memory contact of the cartridge tray in a D2 direction.

The memory tag unit 622 will be further described with reference to FIGS. 20, 23, 24A, 24B, and 25. FIG. 23 is an enlarged perspective view of the right side surface 30*r* of the cartridge tray 3 seen from the front and to the left. FIG. 24A is a top view of the developing cartridge 620 seen in the D2 direction. FIG. 24B is a cross-sectional view taken along the line X2-X2 of FIG. 24A. FIG. 25 is an enlarged top view of the cartridge tray 3 including the developing cartridge 620 attached thereto.

In FIGS. 20 and 24B, the flange portion 628 of the developing frame 624 is located behind the memory tag unit 622 in the D3 direction. The flange portion 628 protrudes in the D1 direction from the right side portion 624*a* of the developing frame 624 in the D1 direction. The flange portion 628 is located at least overlapping the memory tag unit 622 in the D2 direction. In the present exemplary embodiment, the flange portion 628 is located overlapping the entire area where the memory tag unit 622 lies in the D2 direction.

FIG. 23 is a perspective view of the right side surface 30*r* of the cartridge tray 3 seen from inside. The memory contact 720Y protrudes inward in the D1 direction from the inner side of the right side surface 30*r*. The memory contact 720Y includes four electrode portions to be electrically connected to the memory tag 621 (FIG. 21A). The four electrode portions are arranged in a row in the D1 direction. The memory contact 720Y has a front surface 720Ya and a back surface 720Yb in the D3 direction, a top surface 720Yc in the D2 direction, and an inner surface 720Yd in the D1 direction. The front surface 720Ya has a recess 720Ya1. The upper surface 720Yc has a slope portion sloping down forward in the D3 direction.

A configuration of the developing cartridge 620 will be described with reference to FIGS. 24A and 24B. As illustrated in FIG. 24A, at least, the memory tag unit 622 overlaps the flange portion 628 in the D1 direction. As illustrated in FIG. 24B, an elastic member 622*c* is located between the tag holding portion 622*a* and the pressure receiving portion 622*b*. The elastic member 622*c* presses the tag holding portion 622*a* and the pressure receiving portion 622*b* in the directions away from each other.

FIG. 25 is a top view of the cartridge tray 3 with the developing cartridge 620 attached thereto in the D2 direction. The memory tag unit 622 of the developing cartridge 620 is engaged with the recess 720Ya1 in the front surface 720Ya of the memory contact 720Y. The back surface 720Yb of the memory contact 720Y is opposed to the flange portion 628 in the D3 direction. The inner surface 720Yd is opposed to the side portion 624*a* of the developing frame 624. The memory contact 720Y includes a portion overlapping the flange portion 628 in the D1 direction.

Figure 26A:
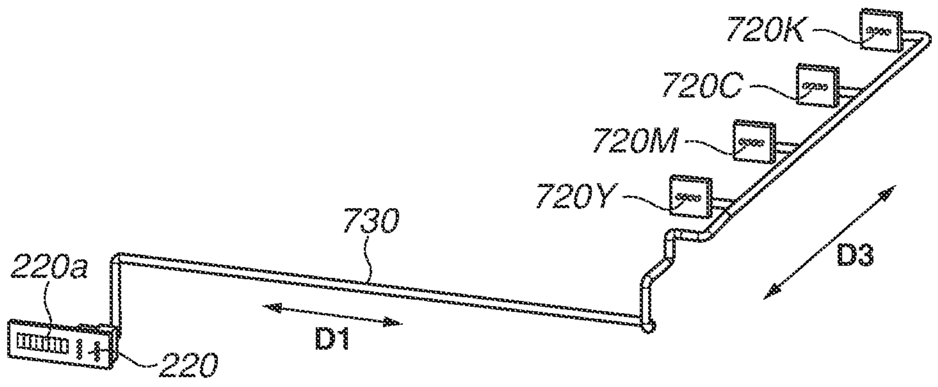
FIG. 26A is an example of a perspective view illustrating the wiring unit of the cartridge tray.
Figure 26B:
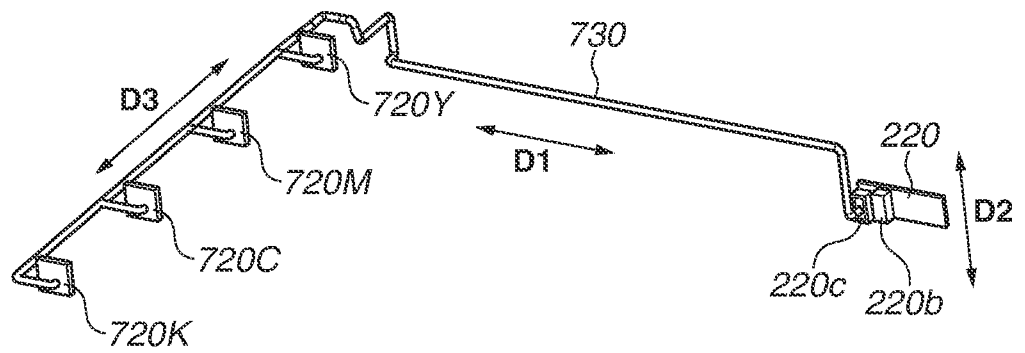
FIG. 26B is an example of a perspective view of the wiring unit of the cartridge tray in a different point of view from the view of FIG. 26A.

FIGS. 26A and 26B are diagrams illustrating the wiring of the contact board 220. As illustrated in FIG. 26A, the contact board 220 is electrically connected to the memory contacts 720Y, 720M, 720C, and 720K via the wiring unit 730. The contact board 220 includes a plurality of electrode portions 220*a*. In the present exemplary embodiment, eight electrode portions 220*a* are included. As illustrated in FIG. 26B, a tray memory 220*b* and a connector 220*c* are located on the back of the contact board 220. The electrode portions 220*a*, the tray memory 220*b*, and the connector 220*c* are arranged in the D1 direction and located at positions overlapping in the D2 direction. In some embodiments, the width of the tray memory 220*b* in the D1 direction ranges from 30 to 50 mm, and the width in the D2 direction ranges from 10 to 15 mm. The tray memory 220*b* stores information about the cartridge tray 3, including the total number of rotations and the sensitivities of the photosensitive drums 4, and the product type.

Effects of the foregoing configuration will be described.

The memory tag 621 is located highest among the contact members of the developing cartridge 620 at the right end in the D1 direction. The to-be-detected member 632 is also located highest among the rotating members at the left end in the D1 direction. As a result, the memory contact 720 on the right side surface 30*r* and a detection unit (not illustrated) on the left side surface 301 are located high in the D2 direction. This prevents a decrease in the rigidity of the right side surface 30*r* and the left side surface 301.

The filling port 624*b* for filling the developer into the developing frame 624 is configured to be sealed by the receptor portion 625. The filling port 624*b*, which is not exposed to the outside of the developing cartridge 620, reduces the risk of the user accidentally opening the toner sealing member (receptor portion 625) to cause toner leakage. Such a configuration allows the memory tag unit 622 and the receptor portion 625 to be aligned without positioning accuracy. As a result, toner sealing performance can be improved with high priority to the dimensional precision of the toner sealing member and the filling port 624*b*. The receptor portion 625 as the toner sealing member located between the right side portion 624*a* and the memory tag unit 622 prevents the user from accidentally detaching the receptor portion 625, reducing the risk of toner leakage. In addition, the receptor portion 625 located between the right side portion 624*a* and the holding member 623 reduces the risk of toner leakage that will occur if the receptor portion 625 comes off when the user accidentally drops the developing cartridge 620. At least, the memory tag unit 622 overlaps the flange portion 628 in the D1 direction. If the user accidentally drops the developing cartridge 620, the flange portion 628 protects the memory tag unit 622, reducing the damage to the memory tag unit 622.

The configuration with the memory contact 720Y of the cartridge tray 3 overlapping the developing cartridge 620 in the D1 direction reduces the size of the cartridge tray 3 in the D1 direction despite the inclusion of the memory tag 621 in the developing cartridge 620.

As describe above, the present disclosure provides one form of an image forming apparatus including a moving unit to which a cartridge provided with a memory unit can be detachably attached and including an intermediate contact configuration for electrically connecting the memory unit and an apparatus electrical contact of the apparatus main body. In particular, a line conductor for electrically connecting the intermediate electrical contact in contact with a memory electrical contact of the memory unit to a unit electrical contact located in a to-be-guided portion on a side surface of the moving unit contributes to miniaturization of the moving unit and the apparatus main body.

Figure 27A:
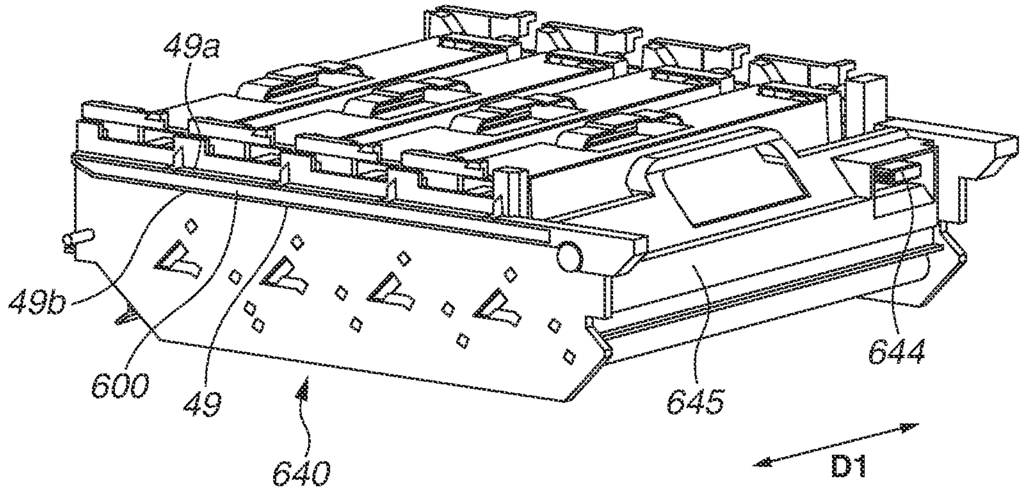
FIG. 27A is a perspective view of a cartridge tray with a lid member attached thereto according to a second exemplary embodiment.
Figure 27B:
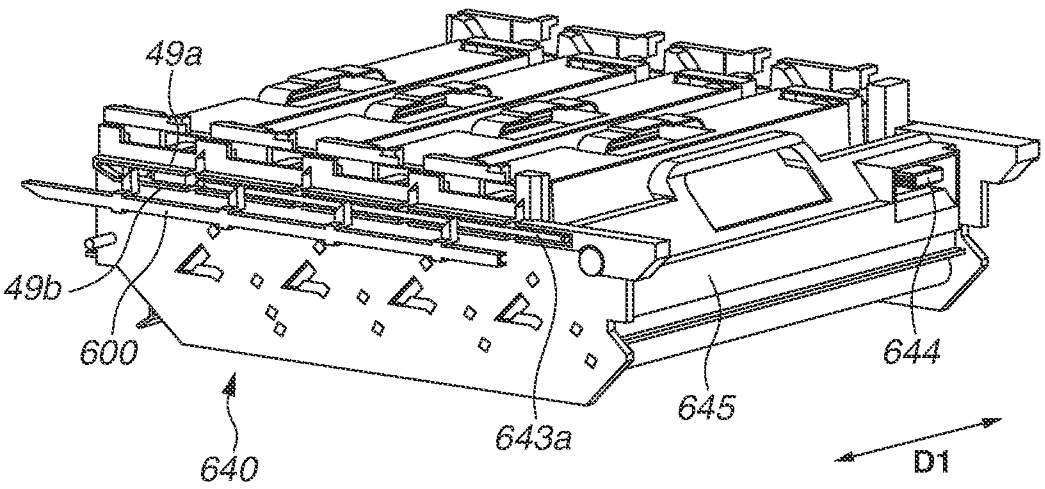
FIG. 27B is an example of a perspective view of the cartridge tray with the lid member detached according to the second exemplary embodiment.

A second exemplary embodiment will be described. FIGS. 27A and 27B are diagrams for describing the second exemplary embodiment. In the second exemplary embodiment, the description similar to that of the first exemplary embodiment will be omitted.

FIGS. 27A and 27B are perspective views of a cartridge tray 640. The cartridge tray 640 includes tray guides 49, similarly to the first exemplary embodiment. The tray guide 49 on the right side surface includes a guide upper portion 49*a* and a guide lower portion 49*b*. A wiring unit 643*a* is located between the guide upper portion 49*a* and the guide lower portion 49*b*. A lid member 600 is attached to between the guide upper portion 49*a* and the guide lower portion 49*b* in a D1 direction. A tray connector 644 is located in a tray back surface 645. The tray back surface 645 is an end surface of the frame of the cartridge tray 640 upstream in the direction in which the cartridge tray 640 is pulled out of an apparatus main body 650 in a D3 direction.

The tray connector 644 is a connector member for electrically connecting to a main body connector 652. The position of the tray connector 644 is different from that of the tray contact unit 219 according to the first exemplary embodiment.

Figure 28A:
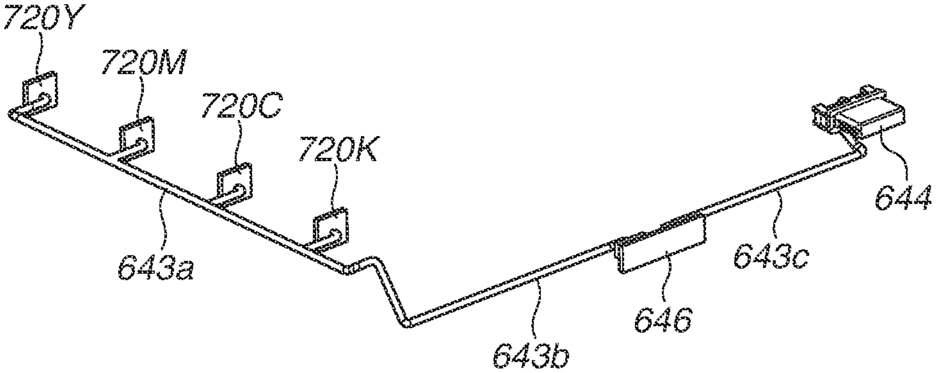
FIG. 28A is an example of a perspective view of a wiring unit of the cartridge tray according to the second exemplary embodiment.
Figure 28B:
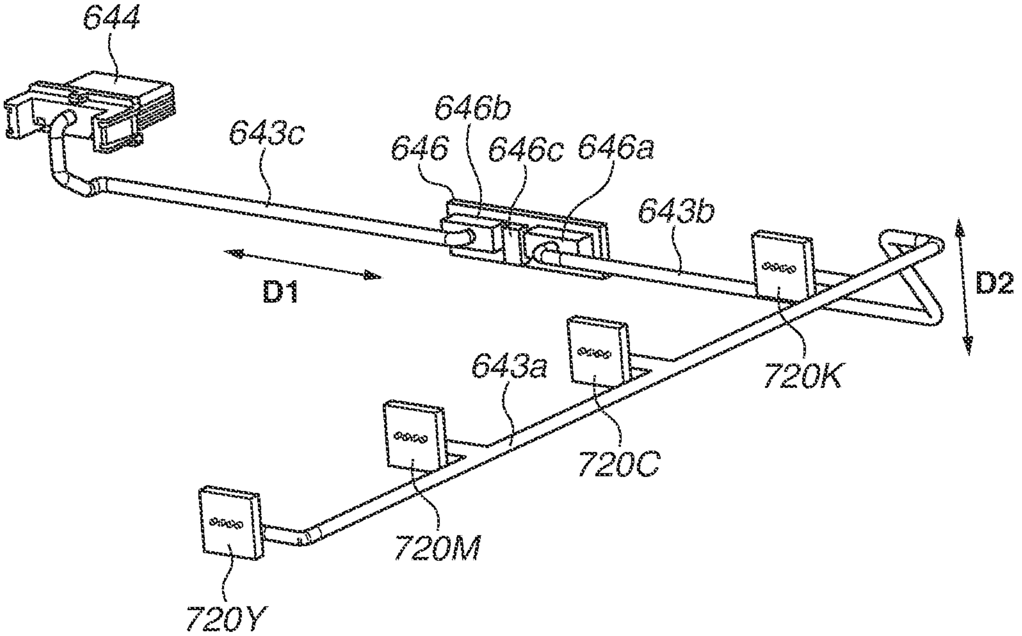
FIG. 28B is an example of a perspective view of the wiring unit of the cartridge tray in a different point of view from the view of FIG. 28A.

FIGS. 28A and 28B are perspective views illustrating wiring units 643 (643*a* to 643*c*) for electrically connecting memory tags 621 (FIG. 20) and the apparatus main body 650. The memory tags 621 are electrically connected to memory contacts 720Y, 720M, 720C, and 720K. The memory contacts 720Y, 720M, 720C, and 720K are electrically connected to the tray connector 644 via the wiring units 643. A relay board 646 is located between the wiring units 643*b* and 643*c*. The relay board 646 includes connectors 646*a* and 646*b* and a tray memory 646*c*. The tray memory 646*c* and the connectors 646*a* and 646*b* are arranged in the D1 direction and located at positions overlapping in a D2 direction. The tray memory 646*c* stores information about the cartridge tray 640, including the total number of rotations and the sensitivities of photosensitive drums 4, and the product type.

Figure 29:
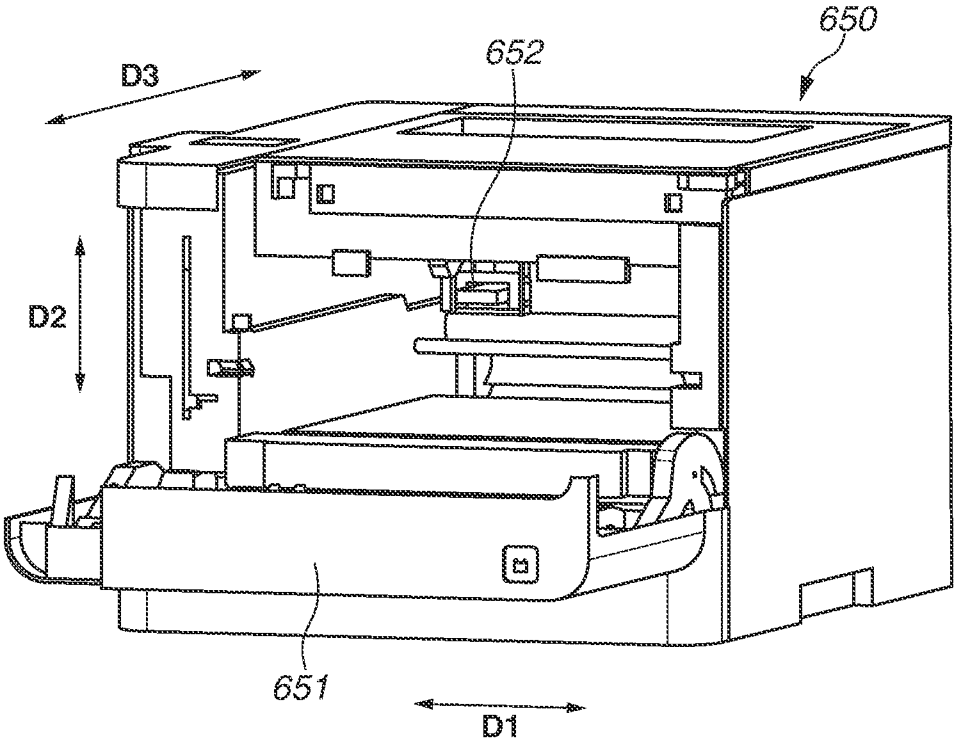
FIG. 29 is an example of a perspective view of an image forming apparatus according to the second exemplary embodiment with the cartridge tray removed.

FIG. 29 is a perspective view of the apparatus main body 650 of the image forming apparatus according to the second exemplary embodiment. In FIG. 29, a front door 651 on the apparatus main body 650 is open. The apparatus main body 650 includes the main body connector 652 in the back in the D3 direction. The main body connector 652 is located in the apparatus main body 650 facing the tray connector 644 of the cartridge tray 640.

Effects of the foregoing configuration will be described.

In the second exemplary embodiment, the tray connector 644 is connected to the main body connector 652 as the cartridge tray 640 is attached to the apparatus main body 650. In attaching the cartridge tray 640 to the apparatus main body 650, its own weight or the operation force exerted by the user can deform the tray guide 49. This changes the relative position between the tray connector 644 and the main body connector 652 in connecting the tray connector 644 to the main body connector 652. The lid member 600 between the guide upper portion 49*a* and the guide lower portion 49*b* increases the strength of the tray guide 49, offering a higher stability in connecting the tray connector 644 to the main body connector 652.

As describe above, the present disclosure provides one form of an image forming apparatus including a moving unit to which a cartridge provided with a memory unit can be detachably attached and including an intermediate contact configuration for electrically connecting the memory unit and an apparatus electrical contact of the apparatus main body. In particular, a line conductor for electrically connecting the intermediate electrical contact in contact with a memory electrical contact of the memory unit to a unit electrical contact located in a to-be-guided portion on a side surface of the moving unit contributes to miniaturization of the moving unit and the apparatus main body.

While the exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge comprising:

a development roller that bears a toner on a surface and is rotatable;

a development frame that has a side face portion, supports the development roller rotatably, and is capable of containing a toner, the side face portion being provided on one end side in a first direction, the first direction being a direction of a rotation axis of the development roller, an opening for refilling a toner being provided in the side face portion;

a sealing member that seals the opening;

a memory tag unit that is disposed on an outside of the side face portion in the first direction and includes a memory electric contact and a protruding portion that protrudes in the first direction; and a holding member that has a fixing portion to be fixed to the development frame, an elongated hole being provided in the holding member, the elongated hole extending in a second direction intersecting with the first direction, the holding member holding the memory tag unit such that the protruding portion and the elongated hole are in engagement with each other in a state of being fixed to the development frame by using the fixing portion, wherein the cartridge is attachable to and detachable from a moving unit that is movable in relation to an image forming apparatus that has a body electric contact, the moving unit including a photosensitive drum, a frame to which the photosensitive drum is supported rotatably, an intermediate electric contact configured to be electrically in contact with the memory electric contact, and a unit electric contact configured to be electrically in contact with the body electric contact, the memory tag unit is held by the holding member movably in the second direction, when the side face portion is viewed in the first direction, in a third direction intersecting with the first direction and with the second direction, the opening is located at a position closer to a second end portion that is an other end portion than a first end portion that is one end portion where the development roller is disposed, and when the memory tag unit is viewed in the first direction, the memory tag unit overlaps with the sealing member.

2. The cartridge according to claim 1, wherein the sealing member faces the holding member.

3. The cartridge according to claim 1, wherein the sealing member overlaps with the holding member in the first direction.

4. The cartridge according to claim 1, wherein the holding member further includes a flange portion disposed along an outer surface of the sealing member in the state of being fixed to the development frame by using the fixing portion, and the flange portion and the sealing member overlap with each other in the second direction.

5. The cartridge according to claim 1, wherein the third direction is a direction in which the cartridge is inserted into the moving unit.

6. The cartridge according to claim 5, wherein the second direction is a direction in which the moving unit is inserted into a main body of the image forming apparatus.

7. The cartridge according to claim 1, wherein the memory tag unit is movable in the third direction in a state in which the protruding portion is in engagement with the elongated hole.

8. The cartridge according to claim 1, wherein the holding member is fixed to the side face portion by fixing the fixing portion the development frame by using a screw.

9. The cartridge according to claim 1, wherein the memory tag unit further includes a holding portion that holds the memory electric contact, and an applied force receiving portion that is capable of relatively moving the holding portion.

10. The cartridge according to claim 1, wherein when the sealing member is viewed in the first direction, the sealing member is provided between the side face portion and the memory tag unit.

11. The cartridge according to claim 1, wherein when the sealing member is viewed in the first direction, the sealing member is provided between the side face portion and the holding member.

12. The cartridge according to claim 1, wherein the memory tag unit is located at a region outward of the development roller in the first direction.

13. A cartridge comprising:

a development roller that bears a toner on a surface and is rotatable;

a development frame that has a side face portion, supports the development roller rotatably, and is capable of containing a toner, the side face portion being provided on one end side in a first direction, the first direction being a direction of a rotation axis of the development roller, an opening for refilling a toner being provided in the side face portion;

a sealing member that seals the opening;

a memory tag unit that is disposed on an outside of the side face portion in the first direction and includes a memory electric contact and a protruding portion that protrudes in the first direction; and a holding member that has a fixing portion to be fixed to the development frame, an elongated hole being provided in the holding member, the elongated hole extending in a second direction intersecting with the first direction, the holding member holding the memory tag unit such that the protruding portion and the elongated hole are in engagement with each other in a state of being fixed to the development frame by using the fixing portion, wherein the memory tag unit is held by the holding member movably in the second direction, when the side face portion is viewed in the first direction, in a third direction intersecting with the first direction and with the second direction, the opening is located at a position closer to a second end portion that is an other end portion than a first end portion that is one end portion where the development roller is disposed, and when the memory tag unit is viewed in the first direction, the memory tag unit overlaps with the sealing member.

14. The cartridge according to claim 13, wherein the sealing member faces the holding member.

15. The cartridge according to claim 13, wherein the sealing member overlaps with the holding member in the first direction.

16. The cartridge according to claim 13, wherein the holding member further includes a flange portion disposed along an outer surface of the sealing member in the state of being fixed to the development frame by using the fixing portion, and the flange portion and the sealing member overlap with each other in the second direction.

17. The cartridge according to claim 13, wherein the third direction is a direction in which the cartridge is inserted into the moving unit.

18. The cartridge according to claim 17, wherein the second direction is a direction in which the moving unit is inserted into a main body of an image forming apparatus.

19. The cartridge according to claim 13, wherein the memory tag unit is movable in the third direction in a state in which the protruding portion is in engagement with the elongated hole.

20. The cartridge according to claim 13, wherein the holding member is fixed to the side face portion by fixing the fixing portion the development frame by using a screw.

21. The cartridge according to claim 13, wherein the memory tag unit further includes a holding portion that holds the memory electric contact, and an applied force receiving portion that is capable of relatively moving the holding portion.

22. The cartridge according to claim 13, wherein when the sealing member is viewed in the first direction, the sealing member is provided between the side face portion and the memory tag unit.

23. The cartridge according to claim 13, wherein when the sealing member is viewed in the first direction, the sealing member is provided between the side face portion and the holding member.

24. The cartridge according to claim 13, wherein the memory tag unit is located at a region outward of the development roller in the first direction.

* * * * *